US010318630B1

(12) United States Patent
Kesin et al.

(10) Patent No.: US 10,318,630 B1
(45) Date of Patent: Jun. 11, 2019

(54) ANALYSIS OF LARGE BODIES OF TEXTUAL DATA

(71) Applicant: Palantir Technologies Inc., Palo Alto, CA (US)

(72) Inventors: Maxim Kesin, Woodmere, NY (US); Paul Gribelyuk, Jersey City, NJ (US)

(73) Assignee: Palantir Technologies Inc., Palo Alto, CA (US)

(*) Notice: Subject to any disclaimer, the term of this patent is extended or adjusted under 35 U.S.C. 154(b) by 0 days.

(21) Appl. No.: 15/678,874

(22) Filed: Aug. 16, 2017

Related U.S. Application Data

(60) Provisional application No. 62/424,844, filed on Nov. 21, 2016.

(51) Int. Cl.
G06F 17/27 (2006.01)
G06F 17/22 (2006.01)
G06F 3/048 (2013.01)

(52) U.S. Cl.
CPC ...... G06F 17/2715 (2013.01); G06F 17/2241 (2013.01); G06F 3/048 (2013.01)

(58) Field of Classification Search
CPC ....................................... G06F 17/02
USPC .......................... 704/1, 9, 10, 257, 270–275
See application file for complete search history.

(56) References Cited

U.S. PATENT DOCUMENTS

| 5,109,399 A | 4/1992 | Thompson |
| 5,329,108 A | 7/1994 | Lamoure |
| 5,632,009 A | 5/1997 | Rao et al. |
| 5,670,987 A | 9/1997 | Doi et al. |
| 5,724,575 A | 3/1998 | Hoover et al. |
| 5,781,704 A | 7/1998 | Rossmo |
| 5,798,769 A | 8/1998 | Chiu et al. |
| 5,845,300 A | 12/1998 | Comer et al. |
| 5,872,973 A | 2/1999 | Mitchell |
| 5,897,636 A | 4/1999 | Kaeser |
| 6,057,757 A | 5/2000 | Arrowsmith et al. |

(Continued)

FOREIGN PATENT DOCUMENTS

| AU | 2014206155 | 12/2015 |
| AU | 2014250678 | 2/2016 |

(Continued)

OTHER PUBLICATIONS

US 8,712,906 B1, 04/2014, Sprague et al. (withdrawn)

(Continued)

Primary Examiner — Jesse S Pullias
(74) Attorney, Agent, or Firm — Schwegman Lundberg & Woessner, P.A.

(57) ABSTRACT

In various example embodiments, a textual identification system is configured to receive a set of search terms and identify a set of textual data based on the search terms. The textual identification system retrieves a data structure including textual identifications for the set of textual data and processes the data structure to generate a modified data structure. The textual identification system sums rows within the modified data structure and identifies one or more elements of interest. The textual identification system then causes presentation of the elements of interest in a first portion of a graphical user interface and the textual identifications for the set of textual data in a second portion of the graphical user interface.

17 Claims, 9 Drawing Sheets

(56) References Cited

U.S. PATENT DOCUMENTS

| | | |
|---|---|---|
| 6,073,129 A | 6/2000 | Levine et al. |
| 6,091,956 A | 7/2000 | Hollenberg |
| 6,094,653 A | 7/2000 | Li et al. |
| 6,161,098 A | 12/2000 | Wallman |
| 6,167,405 A | 12/2000 | Rosensteel, Jr. et al. |
| 6,219,053 B1 | 4/2001 | Tachibana et al. |
| 6,232,971 B1 | 5/2001 | Haynes |
| 6,243,717 B1 | 6/2001 | Gordon et al. |
| 6,247,019 B1 | 6/2001 | Davies |
| 6,279,018 B1 | 8/2001 | Kudrolli et al. |
| 6,304,873 B1 | 10/2001 | Klein et al. |
| 6,341,310 B1 | 1/2002 | Leshem et al. |
| 6,366,933 B1 | 4/2002 | Ball et al. |
| 6,369,835 B1 | 4/2002 | Lin |
| 6,374,251 B1 | 4/2002 | Fayyad et al. |
| 6,418,438 B1 | 7/2002 | Campbell |
| 6,430,305 B1 | 8/2002 | Decker |
| 6,456,997 B1 | 9/2002 | Shukla |
| 6,510,504 B2 | 1/2003 | Satyanarayanan |
| 6,549,752 B2 | 4/2003 | Tsukamoto |
| 6,549,944 B1 | 4/2003 | Weinberg et al. |
| 6,560,620 B1 | 5/2003 | Ching |
| 6,567,936 B1 | 5/2003 | Yang et al. |
| 6,574,635 B2 | 6/2003 | Stauber et al. |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,674,434 B1 | 1/2004 | Chojnacki et al. |
| 6,714,936 B1 | 3/2004 | Nevin, III |
| 6,745,382 B1 | 6/2004 | Zothner |
| 6,775,675 B1 | 8/2004 | Nwabueze et al. |
| 6,820,135 B1 | 11/2004 | Dingman et al. |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka |
| 7,058,648 B1 | 6/2006 | Lightfoot et al. |
| 7,111,231 B1 | 9/2006 | Huck et al. |
| 7,139,800 B2 | 11/2006 | Bellotti et al. |
| 7,158,878 B2 | 1/2007 | Rasmussen |
| 7,162,475 B2 | 1/2007 | Ackerman |
| 7,168,039 B2 | 1/2007 | Bertram |
| 7,171,427 B2 | 1/2007 | Witkowski et al. |
| 7,194,680 B1 | 3/2007 | Roy et al. |
| 7,269,786 B1 | 9/2007 | Malloy et al. |
| 7,278,105 B1 | 10/2007 | Kitts et al. |
| 7,290,698 B2 | 11/2007 | Poslinski et al. |
| 7,318,054 B2 | 1/2008 | Nomura |
| 7,333,998 B2 | 2/2008 | Heckerman et al. |
| 7,370,047 B2 | 5/2008 | Gorman |
| 7,373,669 B2 | 5/2008 | Eisen |
| 7,379,811 B2 | 5/2008 | Rasmussen et al. |
| 7,379,903 B2 | 5/2008 | Caballero et al. |
| 7,392,249 B1 | 6/2008 | Harris et al. |
| 7,426,654 B2 | 9/2008 | Adams, Jr. et al. |
| 7,451,397 B2 | 11/2008 | Weber et al. |
| 7,454,466 B2 | 11/2008 | Bellotti et al. |
| 7,461,077 B1 | 12/2008 | Greenwood et al. |
| 7,461,158 B2 | 12/2008 | Rider et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,558,677 B2 | 7/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak et al. |
| 7,725,530 B2 | 5/2010 | Sah et al. |
| 7,725,547 B2 | 5/2010 | Albertson et al. |
| 7,725,728 B2 | 5/2010 | Ama et al. |
| 7,730,082 B2 | 6/2010 | Sah et al. |
| 7,730,109 B2 | 6/2010 | Rohrs et al. |
| 7,756,843 B1 | 7/2010 | Palmer |
| 7,761,407 B1 | 7/2010 | Stern |
| 7,770,100 B2 | 8/2010 | Chamberlain et al. |
| 7,783,658 B1 | 8/2010 | Bayliss |
| 7,805,457 B1 | 9/2010 | Viola et al. |
| 7,809,703 B2 | 10/2010 | Balabhadrapatruni et al. |
| 7,814,084 B2 | 10/2010 | Hallett et al. |
| 7,814,102 B2 | 10/2010 | Miller |
| 7,818,658 B2 | 10/2010 | Chen |
| 7,870,493 B2 | 1/2011 | Pall et al. |
| 7,894,984 B2 | 2/2011 | Rasmussen et al. |
| 7,899,611 B2 | 3/2011 | Downs et al. |
| 7,899,796 B1 | 3/2011 | Borthwick et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,979,457 B1 | 7/2011 | Garman |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,037,046 B2 | 10/2011 | Udezue et al. |
| 8,041,714 B2 | 10/2011 | Aymeloglu et al. |
| 8,046,283 B2 | 10/2011 | Burns et al. |
| 8,046,362 B2 | 10/2011 | Bayliss |
| 8,054,756 B2 | 11/2011 | Chand et al. |
| 8,095,582 B2 | 1/2012 | Cramer |
| 8,103,543 B1 | 1/2012 | Zwicky |
| 8,112,425 B2 | 2/2012 | Baum et al. |
| 8,126,848 B2 | 2/2012 | Wagner |
| 8,134,457 B2 | 3/2012 | Velipasalar et al. |
| 8,135,679 B2 | 3/2012 | Bayliss |
| 8,135,719 B2 | 3/2012 | Bayliss |
| 8,145,703 B2 | 3/2012 | Frishert et al. |
| 8,185,819 B2 | 5/2012 | Sah et al. |
| 8,196,184 B2 | 6/2012 | Amirov et al. |
| 8,214,361 B1 | 7/2012 | Sandler et al. |
| 8,214,490 B1 | 7/2012 | Vos et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,266,168 B2 | 9/2012 | Bayliss |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |

(56) References Cited

U.S. PATENT DOCUMENTS

| | | |
|---|---|---|
| 8,312,546 B2 | 11/2012 | Alme |
| 8,321,943 B1 | 11/2012 | Walters et al. |
| 8,347,398 B1 | 1/2013 | Weber |
| 8,352,881 B2 | 1/2013 | Champion et al. |
| 8,368,695 B2 | 2/2013 | Howell et al. |
| 8,386,377 B1 | 2/2013 | Xiong et al. |
| 8,392,394 B1 | 3/2013 | Kumar et al. |
| 8,397,171 B2 | 3/2013 | Klassen et al. |
| 8,412,707 B1 | 4/2013 | Mianji |
| 8,447,674 B2 | 5/2013 | Choudhuri et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,484,168 B2 | 7/2013 | Bayliss |
| 8,489,331 B2 | 7/2013 | Kopf et al. |
| 8,489,623 B2 | 7/2013 | Jain et al. |
| 8,489,641 B1 | 7/2013 | Seefeld et al. |
| 8,495,077 B2 | 7/2013 | Bayliss |
| 8,498,969 B2 | 7/2013 | Bayliss |
| 8,498,984 B1 | 7/2013 | Hwang et al. |
| 8,504,542 B2 | 8/2013 | Chang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,595,234 B2 | 11/2013 | Siripurapu et al. |
| 8,600,872 B1 | 12/2013 | Yan |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,682,812 B1 | 3/2014 | Ranjan |
| 8,688,573 B1 | 4/2014 | Rukonic et al. |
| 8,689,108 B1 | 4/2014 | Duffield et al. |
| 8,700,643 B1 | 4/2014 | Gossweiler, III |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy, Sr. et al. |
| 8,744,890 B1 | 6/2014 | Bernier et al. |
| 8,745,516 B2 | 6/2014 | Mason et al. |
| 8,781,169 B2 | 7/2014 | Jackson et al. |
| 8,786,605 B1 | 7/2014 | Curtis et al. |
| 8,787,939 B2 | 7/2014 | Papakipos et al. |
| 8,788,405 B1 | 7/2014 | Sprague et al. |
| 8,788,407 B1 | 7/2014 | Singh et al. |
| 8,799,799 B1 | 8/2014 | Cervelli et al. |
| 8,806,355 B2 | 8/2014 | Twiss et al. |
| 8,812,960 B1 | 8/2014 | Sun et al. |
| 8,818,892 B1 | 8/2014 | Sprague et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,898,184 B1 | 11/2014 | Garman |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,930,331 B2 | 1/2015 | McGrew et al. |
| 8,937,619 B2 | 1/2015 | Sharma et al. |
| 8,938,686 B1 | 1/2015 | Erenrich et al. |
| 8,949,164 B1 | 2/2015 | Mohler |
| 8,954,410 B2 | 2/2015 | Chang et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,069,842 B2 | 6/2015 | Melby |
| 9,092,482 B2 | 7/2015 | Harris et al. |
| 9,100,428 B1 | 8/2015 | Visbal |
| 9,111,281 B2 | 8/2015 | Stibel et al. |
| 9,116,975 B2 | 8/2015 | Shankar et al. |
| 9,129,219 B1 | 9/2015 | Robertson et al. |
| 9,135,658 B2 | 9/2015 | Sprague et al. |
| 9,146,954 B1 | 9/2015 | Boe et al. |
| 9,165,299 B1 | 10/2015 | Stowe et al. |
| 9,177,344 B1 | 11/2015 | Singh et al. |
| 9,171,334 B1 | 12/2015 | Visbal et al. |
| 9,202,249 B1 | 12/2015 | Cohen et al. |
| 9,208,159 B2 | 12/2015 | Stowe et al. |
| 9,229,952 B1 | 1/2016 | Meacham et al. |
| 9,230,280 B1 | 1/2016 | Maag et al. |
| 9,256,664 B2 | 2/2016 | Chakerian et al. |
| 9,280,532 B2 | 3/2016 | Cicerone et al. |
| 9,348,920 B1 | 3/2016 | Kesin |
| 9,344,447 B2 | 5/2016 | Cohen et al. |
| 9,367,872 B1 | 6/2016 | Visbal et al. |
| 9,535,974 B1 | 1/2017 | Kesin et al. |
| 9,547,693 B1 | 1/2017 | Sheasby et al. |
| 9,619,557 B2 | 4/2017 | Kesin et al. |
| 2001/0021936 A1 | 9/2001 | Bertram |
| 2001/0051949 A1 | 12/2001 | Carey et al. |
| 2001/0056522 A1 | 12/2001 | Satyanarayana |
| 2002/0013781 A1 | 1/2002 | Petersen |
| 2002/0033848 A1 | 3/2002 | Sciammarella et al. |
| 2002/0065708 A1 | 5/2002 | Senay et al. |
| 2002/0083039 A1 | 6/2002 | Ferrari et al. |
| 2002/0091694 A1 | 7/2002 | Hrle et al. |
| 2002/0091707 A1 | 7/2002 | Keller et al. |
| 2002/0095360 A1 | 7/2002 | Joao |
| 2002/0095658 A1 | 7/2002 | Shulman et al. |
| 2002/0103705 A1 | 8/2002 | Brady |
| 2002/0116120 A1 | 8/2002 | Ruiz et al. |
| 2002/0130907 A1 | 9/2002 | Chi et al. |
| 2002/0147805 A1 | 10/2002 | Leshem et al. |
| 2002/0169759 A1 | 11/2002 | Kraft et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0033228 A1 | 2/2003 | Bosworth-Davies |
| 2003/0036848 A1 | 2/2003 | Sheha et al. |
| 2003/0039948 A1 | 2/2003 | Donahue |
| 2003/0074368 A1 | 4/2003 | Schuetze et al. |
| 2003/0097330 A1 | 5/2003 | Hillmer et al. |
| 2003/0105759 A1 | 6/2003 | Bess et al. |
| 2003/0115481 A1 | 6/2003 | Baird et al. |
| 2003/0120675 A1 | 6/2003 | Stauber et al. |
| 2003/0126102 A1 | 7/2003 | Borthwick |
| 2003/0130993 A1 | 7/2003 | Mendelevitch et al. |
| 2003/0140106 A1 | 7/2003 | Raguseo |
| 2003/0144868 A1 | 7/2003 | MacIntyre et al. |
| 2003/0154044 A1 | 8/2003 | Lundstedt et al. |
| 2003/0163352 A1 | 8/2003 | Surpin et al. |
| 2003/0172014 A1 | 9/2003 | Quackenbush et al. |
| 2003/0200217 A1 | 10/2003 | Ackerman |
| 2003/0212718 A1 | 11/2003 | Tester |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0111480 A1 | 6/2004 | Yue |
| 2004/0117345 A1 | 6/2004 | Bamford et al. |
| 2004/0117387 A1 | 6/2004 | Civetta et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0148301 A1 | 7/2004 | McKay et al. |
| 2004/0153418 A1 | 8/2004 | Hanweck |
| 2004/0160309 A1 | 8/2004 | Stilp |
| 2004/0163039 A1 | 8/2004 | Gorman |
| 2004/0181554 A1 | 9/2004 | Heckerman et al. |

(56) References Cited

U.S. PATENT DOCUMENTS

| | | |
|---|---|---|
| 2004/0193600 A1 | 9/2004 | Kaasten et al. |
| 2004/0205524 A1 | 10/2004 | Richter et al. |
| 2004/0221223 A1 | 11/2004 | Yu et al. |
| 2004/0236688 A1 | 11/2004 | Bozeman |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0078858 A1 | 4/2005 | Yao et al. |
| 2005/0080769 A1 | 4/2005 | Gemmell et al. |
| 2005/0086207 A1 | 4/2005 | Heuer et al. |
| 2005/0097441 A1 | 5/2005 | Herbach et al. |
| 2005/0108063 A1 | 5/2005 | Madill, Jr. et al. |
| 2005/0108231 A1 | 5/2005 | Findleton et al. |
| 2005/0114763 A1 | 5/2005 | Nonomura et al. |
| 2005/0125715 A1 | 6/2005 | Di Franco et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0222928 A1 | 10/2005 | Steier et al. |
| 2005/0246327 A1 | 11/2005 | Yeung et al. |
| 2005/0251786 A1 | 11/2005 | Citron et al. |
| 2005/0289524 A1 | 12/2005 | McGinnes |
| 2006/0026120 A1 | 2/2006 | Carolan et al. |
| 2006/0026170 A1 | 2/2006 | Kreitler et al. |
| 2006/0045470 A1 | 3/2006 | Poslinski et al. |
| 2006/0059139 A1 | 3/2006 | Robinson |
| 2006/0074866 A1 | 4/2006 | Chamberlain et al. |
| 2006/0074881 A1 | 4/2006 | Vembu et al. |
| 2006/0080283 A1 | 4/2006 | Shipman |
| 2006/0080316 A1 | 4/2006 | Gilmore et al. |
| 2006/0080616 A1 | 4/2006 | Vogel et al. |
| 2006/0080619 A1 | 4/2006 | Carlson et al. |
| 2006/0093222 A1 | 5/2006 | Saffer et al. |
| 2006/0095521 A1 | 5/2006 | Patinkin |
| 2006/0106847 A1 | 5/2006 | Eckardt, III et al. |
| 2006/0116991 A1 | 6/2006 | Calderwood |
| 2006/0129746 A1 | 6/2006 | Porter |
| 2006/0136402 A1 | 6/2006 | Lee |
| 2006/0139375 A1 | 6/2006 | Rasmussen et al. |
| 2006/0142949 A1 | 6/2006 | Helt |
| 2006/0143034 A1 | 6/2006 | Rothermel et al. |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0161558 A1 | 7/2006 | Tamma et al. |
| 2006/0184889 A1 | 8/2006 | Molander |
| 2006/0203337 A1 | 9/2006 | White |
| 2006/0209085 A1 | 9/2006 | Wong et al. |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0253502 A1 | 11/2006 | Raman et al. |
| 2006/0265397 A1 | 11/2006 | Bryan et al. |
| 2006/0271277 A1 | 11/2006 | Hu et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0057966 A1 | 3/2007 | Ohno et al. |
| 2007/0061487 A1 | 3/2007 | Moore et al. |
| 2007/0078832 A1 | 4/2007 | Ott, IV et al. |
| 2007/0083541 A1 | 4/2007 | Fraleigh et al. |
| 2007/0094389 A1 | 4/2007 | Nussey et al. |
| 2007/0106582 A1 | 5/2007 | Baker et al. |
| 2007/0130206 A1 | 6/2007 | Zhou et al. |
| 2007/0143253 A1 | 6/2007 | Kostamaa et al. |
| 2007/0150369 A1 | 6/2007 | Zivin |
| 2007/0150801 A1 | 6/2007 | Chidlovskii et al. |
| 2007/0050429 A1 | 7/2007 | Goldring et al. |
| 2007/0156673 A1 | 7/2007 | Maga et al. |
| 2007/0162454 A1 | 7/2007 | D'Albora et al. |
| 2007/0174760 A1 | 7/2007 | Chamberlain et al. |
| 2007/0185850 A1 | 8/2007 | Walters et al. |
| 2007/0185867 A1 | 8/2007 | Maga et al. |
| 2007/0192122 A1 | 8/2007 | Routson et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous et al. |
| 2007/0233756 A1 | 10/2007 | D'Souza et al. |
| 2007/0240062 A1 | 10/2007 | Christena et al. |
| 2007/0266336 A1 | 11/2007 | Nojima et al. |
| 2007/0271317 A1 | 11/2007 | Carmel |
| 2007/0284433 A1 | 12/2007 | Domenica et al. |
| 2007/0294200 A1 | 12/2007 | Au |
| 2007/0294643 A1 | 12/2007 | Kyle |
| 2008/0015970 A1 | 1/2008 | Brookfield et al. |
| 2008/0016216 A1 | 1/2008 | Worley et al. |
| 2008/0040275 A1 | 2/2008 | Paulsen et al. |
| 2008/0040684 A1 | 2/2008 | Crump et al. |
| 2008/0051989 A1 | 2/2008 | Welsh |
| 2008/0052142 A1 | 2/2008 | Bailey et al. |
| 2008/0065655 A1 | 3/2008 | Chakravarthy et al. |
| 2008/0071731 A1 | 3/2008 | Ma et al. |
| 2008/0072180 A1* | 3/2008 | Chevalier ............ G06F 17/3089 |
| | | 715/861 |
| 2008/0077597 A1 | 3/2008 | Butler |
| 2008/0077642 A1 | 3/2008 | Carbone |
| 2008/0082486 A1 | 4/2008 | Lermant et al. |
| 2008/0104019 A1 | 5/2008 | Nath |
| 2008/0104060 A1 | 5/2008 | Abhyankar et al. |
| 2008/0126951 A1 | 5/2008 | Sood et al. |
| 2008/0133567 A1 | 6/2008 | Ames et al. |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0104149 A1 | 8/2008 | Vishniac et al. |
| 2008/0195417 A1 | 8/2008 | Surpin |
| 2008/0195608 A1 | 8/2008 | Clover |
| 2008/0195672 A1 | 8/2008 | Hamel et al. |
| 2008/0201339 A1 | 8/2008 | McGrew et al. |
| 2008/0208735 A1 | 8/2008 | Balet et al. |
| 2008/0215546 A1 | 9/2008 | Baum et al. |
| 2008/0222295 A1 | 9/2008 | Robinson et al. |
| 2008/0249983 A1 | 10/2008 | Meisels et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270316 A1 | 10/2008 | Guidotti et al. |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0288425 A1 | 11/2008 | Posse et al. |
| 2008/0294663 A1 | 11/2008 | Heinley et al. |
| 2008/0301378 A1 | 12/2008 | Carrie |
| 2008/0301643 A1 | 12/2008 | Appleton et al. |
| 2008/0313132 A1 | 12/2008 | Hao et al. |
| 2009/0002492 A1 | 1/2009 | Velipasalar et al. |
| 2009/0018940 A1 | 1/2009 | Wang et al. |
| 2009/0024505 A1 | 1/2009 | Patel et al. |
| 2009/0024589 A1 | 1/2009 | Sood et al. |
| 2009/0027418 A1 | 1/2009 | Maru et al. |
| 2009/0030915 A1 | 1/2009 | Winter et al. |
| 2009/0031247 A1 | 1/2009 | Walter et al. |
| 2009/0037417 A1 | 2/2009 | Shankar et al. |
| 2009/0044279 A1 | 2/2009 | Crawford et al. |

(56) References Cited

U.S. PATENT DOCUMENTS

| | | |
|---|---|---|
| 2009/0055251 A1 | 2/2009 | Shah et al. |
| 2009/0076845 A1 | 3/2009 | Bellin et al. |
| 2009/0082997 A1 | 3/2009 | Tokman et al. |
| 2009/0083184 A1 | 3/2009 | Eisen |
| 2009/0088964 A1 | 4/2009 | Schaaf et al. |
| 2009/0094270 A1 | 4/2009 | Alirez et al. |
| 2009/0106178 A1 | 4/2009 | Chu |
| 2009/0106308 A1 | 4/2009 | Killian et al. |
| 2009/0112745 A1 | 4/2009 | Stefanescu |
| 2009/0119309 A1 | 5/2009 | Gibson et al. |
| 2009/0125359 A1 | 5/2009 | Knapic et al. |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed, Jr. et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0150854 A1 | 6/2009 | Elaasar et al. |
| 2009/0157732 A1 | 6/2009 | Hao et al. |
| 2009/0164387 A1 | 6/2009 | Armstrong et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172669 A1 | 7/2009 | Bobak et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Hamilton Whyte |
| 2009/0187548 A1 | 7/2009 | Ji et al. |
| 2009/0192957 A1 | 7/2009 | Subramanian et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0240664 A1 | 9/2009 | Dinker et al. |
| 2009/0249244 A1 | 10/2009 | Robinson et al. |
| 2009/0254842 A1 | 10/2009 | Leacock et al. |
| 2009/0254970 A1 | 10/2009 | Agarwal et al. |
| 2009/0254971 A1 | 10/2009 | Herz et al. |
| 2009/0271343 A1 | 10/2009 | Vaiciulis et al. |
| 2009/0271359 A1 | 10/2009 | Bayliss |
| 2009/0271435 A1 | 10/2009 | Yako et al. |
| 2009/0281839 A1 | 11/2009 | Lynn et al. |
| 2009/0287470 A1 | 11/2009 | Farnsworth et al. |
| 2009/0292626 A1 | 11/2009 | Oxford et al. |
| 2009/0300589 A1 | 12/2009 | Watters et al. |
| 2009/0307049 A1 | 12/2009 | Elliott, Jr. et al. |
| 2009/0313223 A1 | 12/2009 | Rantanen et al. |
| 2009/0313311 A1 | 12/2009 | Hoffmann et al. |
| 2009/0313463 A1 | 12/2009 | Pang et al. |
| 2009/0318775 A1 | 12/2009 | Michelson et al. |
| 2009/0319418 A1 | 12/2009 | Herz |
| 2009/0319891 A1 | 12/2009 | MacKinlay et al. |
| 2009/0327208 A1 | 12/2009 | Bittner et al. |
| 2010/0011282 A1 | 1/2010 | Dollard et al. |
| 2010/0030722 A1 | 2/2010 | Goodson et al. |
| 2010/0031141 A1 | 2/2010 | Summers et al. |
| 2010/0036831 A1 | 2/2010 | Vemuri et al. |
| 2010/0042922 A1 | 2/2010 | Bradateanu et al. |
| 2010/0057622 A1 | 3/2010 | Faith |
| 2010/0057716 A1 | 3/2010 | Stefik et al. |
| 2010/0070489 A1 | 3/2010 | Aymeloglu et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0076939 A1 | 3/2010 | Iwaki et al. |
| 2010/0077481 A1 | 3/2010 | Polyakov et al. |
| 2010/0077483 A1 | 3/2010 | Stolfo et al. |
| 2010/0082541 A1 | 4/2010 | Kottomtharayil |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0106611 A1 | 4/2010 | Paulsen et al. |
| 2010/0106752 A1 | 4/2010 | Eckardt, III et al. |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0122152 A1 | 5/2010 | Chamberlain et al. |
| 2010/0125546 A1 | 5/2010 | Barrett et al. |
| 2010/0131457 A1 | 5/2010 | Heimendinger |
| 2010/0131502 A1 | 5/2010 | Fordham |
| 2010/0138842 A1 | 6/2010 | Balko et al. |
| 2010/0145909 A1 | 6/2010 | Ngo |
| 2010/0161565 A1 | 6/2010 | Lee et al. |
| 2010/0161688 A1 | 6/2010 | Kesselman et al. |
| 2010/0161735 A1 | 6/2010 | Sharma |
| 2010/0162176 A1 | 6/2010 | Dunton |
| 2010/0169237 A1 | 7/2010 | Howard |
| 2010/0185691 A1 | 7/2010 | Irmak et al. |
| 2010/0191563 A1 | 7/2010 | Schlaifer et al. |
| 2010/0191884 A1 | 7/2010 | Holenstein et al. |
| 2010/0198684 A1 | 8/2010 | Eraker et al. |
| 2010/0199225 A1 | 8/2010 | Coleman et al. |
| 2010/0211535 A1 | 8/2010 | Rosenberger |
| 2010/0211550 A1 | 8/2010 | Daniello et al. |
| 2010/0211618 A1 | 8/2010 | Anderson et al. |
| 2010/0228812 A1 | 9/2010 | Uomini |
| 2010/0235606 A1 | 9/2010 | Oreland et al. |
| 2010/0235915 A1 | 9/2010 | Memon et al. |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0283787 A1 | 11/2010 | Hamedi et al. |
| 2010/0293174 A1 | 11/2010 | Bennett |
| 2010/0306029 A1 | 12/2010 | Jolley |
| 2010/0306713 A1 | 12/2010 | Geisner et al. |
| 2010/0312837 A1 | 12/2010 | Bodapati et al. |
| 2010/0313119 A1 | 12/2010 | Baldwin et al. |
| 2010/0318838 A1 | 12/2010 | Katano et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004498 A1 | 1/2011 | Readshaw |
| 2011/0016118 A1* | 1/2011 | Edala ............... G06F 17/30864 707/730 |
| 2011/0029498 A1 | 2/2011 | Ferguson et al. |
| 2011/0029526 A1 | 2/2011 | Knight |
| 2011/0047159 A1 | 2/2011 | Baid et al. |
| 2011/0047540 A1 | 2/2011 | Williams et al. |
| 2011/0055140 A1 | 3/2011 | Roychowdhury |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0087519 A1 | 4/2011 | Fordyce, III et al. |
| 2011/0093327 A1 | 4/2011 | Fordyce, III et al. |
| 2011/0099133 A1 | 4/2011 | Chang et al. |
| 2011/0117878 A1 | 5/2011 | Barash et al. |
| 2011/0119100 A1 | 5/2011 | Ruhl et al. |
| 2011/0131122 A1 | 6/2011 | Griffin et al. |
| 2011/0131547 A1 | 6/2011 | Elaasar |
| 2011/0137766 A1 | 6/2011 | Rasmussen et al. |
| 2011/0153384 A1 | 6/2011 | Horne et al. |
| 2011/0153592 A1 | 6/2011 | DeMarcken |
| 2011/0161096 A1 | 6/2011 | Buehler et al. |
| 2011/0161132 A1 | 6/2011 | Goel et al. |
| 2011/0161137 A1 | 6/2011 | Ubalde et al. |
| 2011/0167054 A1 | 7/2011 | Bailey et al. |
| 2011/0167105 A1 | 7/2011 | Ramakrishnan et al. |
| 2011/0167493 A1 | 7/2011 | Song et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0173619 A1 | 7/2011 | Fish |
| 2011/0178842 A1 | 7/2011 | Rane et al. |
| 2011/0181598 A1 | 7/2011 | O'Neall et al. |
| 2011/0184813 A1 | 7/2011 | Barnes et al. |

(56) References Cited

U.S. PATENT DOCUMENTS

| | | |
|---|---|---|
| 2011/0185316 A1 | 7/2011 | Reid et al. |
| 2011/0196737 A1 | 8/2011 | Vadlamani et al. |
| 2011/0208565 A1 | 8/2011 | Ross et al. |
| 2011/0208724 A1 | 8/2011 | Jones et al. |
| 2011/0213655 A1 | 9/2011 | Henkin et al. |
| 2011/0218934 A1 | 9/2011 | Elser |
| 2011/0218955 A1 | 9/2011 | Tang et al. |
| 2011/0219321 A1 | 9/2011 | Gonzalez Veron et al. |
| 2011/0219450 A1 | 9/2011 | Mcdougal et al. |
| 2011/0225198 A1 | 9/2011 | Edwards et al. |
| 2011/0225650 A1 | 9/2011 | Margolies et al. |
| 2011/0231223 A1 | 9/2011 | Winters |
| 2011/0238413 A1 | 9/2011 | Wu et al. |
| 2011/0238495 A1 | 9/2011 | Kang |
| 2011/0238510 A1 | 9/2011 | Rowen et al. |
| 2011/0238553 A1 | 9/2011 | Raj et al. |
| 2011/0238570 A1 | 9/2011 | Li et al. |
| 2011/0246229 A1 | 10/2011 | Pacha |
| 2011/0251951 A1 | 10/2011 | Kolkowitz et al. |
| 2011/0258158 A1 | 10/2011 | Resende, Jr. et al. |
| 2011/0258190 A1 | 10/2011 | Chen et al. |
| 2011/0258242 A1 | 10/2011 | Eidson et al. |
| 2011/0270604 A1 | 11/2011 | Qi et al. |
| 2011/0270705 A1 | 11/2011 | Parker |
| 2011/0270812 A1 | 11/2011 | Ruby et al. |
| 2011/0270834 A1 | 11/2011 | Sokolan et al. |
| 2011/0289397 A1 | 11/2011 | Eastmond et al. |
| 2011/0289407 A1 | 11/2011 | Naik et al. |
| 2011/0289420 A1 | 11/2011 | Morioka |
| 2011/0291851 A1 | 12/2011 | Whisenant |
| 2011/0295649 A1 | 12/2011 | Fine et al. |
| 2011/0307382 A1 | 12/2011 | Siegel |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2011/0314546 A1 | 12/2011 | Aziz et al. |
| 2012/0004904 A1 | 1/2012 | Shin et al. |
| 2012/0005581 A1 | 1/2012 | Turner |
| 2012/0011238 A1 | 1/2012 | Rathod |
| 2012/0011245 A1 | 1/2012 | Gillette et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0075324 A1 | 3/2012 | Cardno et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084135 A1 | 4/2012 | Nissan et al. |
| 2012/0084287 A1 | 4/2012 | Lakshminarayan et al. |
| 2012/0084866 A1 | 4/2012 | Stolfo |
| 2012/0106801 A1 | 5/2012 | Jackson |
| 2012/0116828 A1 | 5/2012 | Shannon |
| 2012/0117082 A1 | 5/2012 | Koperda et al. |
| 2012/0123989 A1 | 5/2012 | Yu et al. |
| 2012/0124179 A1 | 5/2012 | Cappio et al. |
| 2012/0131107 A1 | 5/2012 | Yost |
| 2012/0131512 A1 | 5/2012 | Takeuchi et al. |
| 2012/0136804 A1 | 5/2012 | Lucia et al. |
| 2012/0137235 A1 | 5/2012 | Ts et al. |
| 2012/0144335 A1 | 6/2012 | Abeln et al. |
| 2012/0150791 A1 | 6/2012 | Willson |
| 2012/0158527 A1 | 6/2012 | Cannelongo et al. |
| 2012/0158626 A1 | 6/2012 | Zhu et al. |
| 2012/0159307 A1 | 6/2012 | Chung et al. |
| 2012/0159312 A1 | 6/2012 | Mital et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0180002 A1 | 7/2012 | Campbell et al. |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0203584 A1 | 8/2012 | Mishor et al. |
| 2012/0203708 A1 | 8/2012 | Psota et al. |
| 2012/0208636 A1 | 8/2012 | Feige |
| 2012/0215784 A1 | 8/2012 | King et al. |
| 2012/0215898 A1 | 8/2012 | Shah et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss et al. |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0266245 A1 | 10/2012 | McDougal et al. |
| 2012/0278273 A1 | 11/2012 | Fang |
| 2012/0284345 A1 | 11/2012 | Costenaro et al. |
| 2012/0290879 A1 | 11/2012 | Shibuya et al. |
| 2012/0296907 A1 | 11/2012 | Long et al. |
| 2012/0304244 A1 | 11/2012 | Xie et al. |
| 2012/0310831 A1 | 12/2012 | Harris et al. |
| 2012/0310838 A1 | 12/2012 | Harris et al. |
| 2012/0311684 A1 | 12/2012 | Paulsen et al. |
| 2012/0323829 A1 | 12/2012 | Stokes |
| 2012/0323888 A1 | 12/2012 | Osann, Jr. |
| 2012/0330801 A1 | 12/2012 | Mcdougal et al. |
| 2012/0330908 A1 | 12/2012 | Stowe et al. |
| 2012/0330973 A1 | 12/2012 | Ghuneim et al. |
| 2013/0006426 A1 | 1/2013 | Healey et al. |
| 2013/0006655 A1 | 1/2013 | Van Arkel et al. |
| 2013/0006668 A1 | 1/2013 | Van Arkel et al. |
| 2013/0006725 A1 | 1/2013 | Simanek et al. |
| 2013/0006916 A1 | 1/2013 | Mcbride et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0024307 A1 | 1/2013 | Fuerstenberg et al. |
| 2013/0024339 A1 | 1/2013 | Choudhuri et al. |
| 2013/0036346 A1 | 2/2013 | Cicerone |
| 2013/0046635 A1 | 2/2013 | Grigg et al. |
| 2013/0046842 A1 | 2/2013 | Muntz et al. |
| 2013/0050217 A1 | 2/2013 | Armitage |
| 2013/0054306 A1 | 2/2013 | Bhalla et al. |
| 2013/0055145 A1 | 2/2013 | Antony et al. |
| 2013/0057551 A1 | 3/2013 | Ebert et al. |
| 2013/0060742 A1 | 3/2013 | Chang et al. |
| 2013/0060786 A1 | 3/2013 | Serrano et al. |
| 2013/0061169 A1 | 3/2013 | Pearcy |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0096988 A1 | 4/2013 | Grossman et al. |
| 2013/0097130 A1 | 4/2013 | Bingol et al. |
| 2013/0097482 A1 | 4/2013 | Marantz et al. |
| 2013/0101159 A1 | 4/2013 | Chao et al. |
| 2013/0110746 A1 | 5/2013 | Ahn |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117011 A1 | 5/2013 | Ahmed et al. |
| 2013/0117651 A1 | 5/2013 | Waldman et al. |
| 2013/0132381 A1 | 5/2013 | Chakrabarti et al. |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0159340 A1 | 6/2013 | Blanco et al. |
| 2013/0160120 A1 | 6/2013 | Malaviya et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |

(56) References Cited

U.S. PATENT DOCUMENTS

| | | |
|---|---|---|
| 2013/0185245 A1 | 7/2013 | Anderson et al. |
| 2013/0185307 A1 | 7/2013 | El-yaniv et al. |
| 2013/0185320 A1 | 7/2013 | Iwasaki et al. |
| 2013/0197925 A1 | 8/2013 | Blue |
| 2013/0211985 A1 | 8/2013 | Clark et al. |
| 2013/0224696 A1 | 8/2013 | Wolfe et al. |
| 2013/0225212 A1 | 8/2013 | Khan |
| 2013/0226318 A1 | 8/2013 | Procyk et al. |
| 2013/0226953 A1 | 8/2013 | Markovich et al. |
| 2013/0232045 A1 | 9/2013 | Tai et al. |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0276799 A1 | 10/2013 | Davidson et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0311375 A1 | 11/2013 | Priebatsch |
| 2013/0318060 A1 | 11/2013 | Chang et al. |
| 2013/0318594 A1 | 11/2013 | Hoy et al. |
| 2013/0318604 A1 | 11/2013 | Coates et al. |
| 2013/0339218 A1 | 12/2013 | Subramanian et al. |
| 2013/0339514 A1 | 12/2013 | Crank et al. |
| 2014/0006109 A1 | 1/2014 | Callioni et al. |
| 2014/0012796 A1 | 1/2014 | Petersen et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0058763 A1 | 2/2014 | Zizzamia et al. |
| 2014/0058914 A1 | 2/2014 | Song et al. |
| 2014/0059038 A1 | 2/2014 | Mcpherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0081652 A1 | 3/2014 | Klindworth |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0136285 A1 | 5/2014 | Carvalho |
| 2014/0143009 A1 | 5/2014 | Brice et al. |
| 2014/0149130 A1 | 5/2014 | Getchius |
| 2014/0149272 A1 | 5/2014 | Hirani et al. |
| 2014/0149436 A1 | 5/2014 | Bahrami et al. |
| 2014/0156484 A1 | 6/2014 | Chan et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0181833 A1 | 6/2014 | Bird et al. |
| 2014/0189536 A1 | 7/2014 | Lange et al. |
| 2014/0189870 A1 | 7/2014 | Singla et al. |
| 2014/0195515 A1 | 7/2014 | Baker et al. |
| 2014/0195887 A1 | 7/2014 | Ellis et al. |
| 2014/0214579 A1 | 7/2014 | Shen et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0244388 A1 | 8/2014 | Manouchehri et al. |
| 2014/0258246 A1 | 9/2014 | Lo Faro et al. |
| 2014/0267294 A1 | 9/2014 | Ma et al. |
| 2014/0267295 A1 | 9/2014 | Sharma et al. |
| 2014/0279824 A1 | 9/2014 | Tamayo |
| 2014/0283067 A1 | 9/2014 | Call et al. |
| 2014/0310266 A1 | 10/2014 | Greenfield |
| 2014/0310282 A1 | 10/2014 | Sprague et al. |
| 2014/0316911 A1 | 10/2014 | Gross |
| 2014/0324876 A1 | 10/2014 | Konik et al. |
| 2014/0330845 A1 | 11/2014 | Feldschuh |
| 2014/0331119 A1 | 11/2014 | Dixon et al. |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0344231 A1 | 11/2014 | Stowe et al. |
| 2014/0351070 A1 | 11/2014 | Christner et al. |
| 2014/0358829 A1 | 12/2014 | Hurwitz |
| 2014/0366132 A1 | 12/2014 | Stiansen et al. |
| 2014/0379755 A1 | 12/2014 | Kuriakose et al. |
| 2014/0379812 A1 | 12/2014 | Bastide, II et al. |
| 2015/0019394 A1 | 1/2015 | Unser et al. |
| 2015/0039886 A1 | 2/2015 | Kajol et al. |
| 2015/0046870 A1 | 2/2015 | Goldenberg et al. |
| 2015/0067533 A1 | 3/2015 | Volach |
| 2015/0073929 A1 | 3/2015 | Psota et al. |
| 2015/0073954 A1 | 3/2015 | Braff |
| 2015/0089353 A1 | 3/2015 | Folkening |
| 2015/0089424 A1 | 3/2015 | Duffield et al. |
| 2015/0095773 A1 | 4/2015 | Gonsalves et al. |
| 2015/0100897 A1 | 4/2015 | Sun et al. |
| 2015/0100907 A1 | 4/2015 | Erenrich et al. |
| 2015/0106170 A1 | 4/2015 | Bonica |
| 2015/0106347 A1 | 4/2015 | McGrew et al. |
| 2015/0106379 A1 | 4/2015 | Elliot et al. |
| 2015/0112956 A1 | 4/2015 | Chang et al. |
| 2015/0134599 A1 | 5/2015 | Banerjee et al. |
| 2015/0134666 A1 | 5/2015 | Gattiker et al. |
| 2015/0135256 A1 | 5/2015 | Hoy et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178825 A1 | 6/2015 | Huerta et al. |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0188872 A1 | 7/2015 | White |
| 2015/0212663 A1 | 7/2015 | Papale et al. |
| 2015/0213043 A1 | 7/2015 | Ishii et al. |
| 2015/0213134 A1 | 7/2015 | Nie et al. |
| 2015/0227295 A1 | 8/2015 | Meiklejohn et al. |
| 2015/0235334 A1 | 8/2015 | Wang et al. |
| 2015/0242397 A1 | 8/2015 | Zhuang |
| 2015/0242401 A1 | 8/2015 | Liu |
| 2015/0261817 A1 | 9/2015 | Harris et al. |
| 2015/0309719 A1 | 10/2015 | Ma et al. |
| 2015/0317342 A1 | 11/2015 | Grossman et al. |
| 2015/0324868 A1 | 11/2015 | Kaftan et al. |
| 2015/0338233 A1 | 11/2015 | Cervelli et al. |
| 2015/0341467 A1 | 11/2015 | Lim et al. |
| 2015/0347903 A1 | 12/2015 | Saxena et al. |
| 2015/0378996 A1 | 12/2015 | Kesin et al. |
| 2015/0379413 A1 | 12/2015 | Robertson et al. |
| 2016/0004667 A1 | 1/2016 | Chakerian |
| 2016/0004764 A1 | 1/2016 | Chakerian et al. |
| 2016/0034470 A1 | 2/2016 | Sprague et al. |
| 2016/0034545 A1 | 2/2016 | Shankar et al. |
| 2016/0034555 A1 | 2/2016 | Rahut et al. |
| 2016/0048937 A1 | 2/2016 | Mathura et al. |
| 2016/0062555 A1 | 3/2016 | Ward et al. |
| 2016/0098173 A1 | 4/2016 | Slawinski et al. |
| 2016/0147730 A1 | 5/2016 | Cicerone |
| 2016/0180451 A1 | 6/2016 | Visbal et al. |
| 2016/0180557 A1 | 6/2016 | Yousaf et al. |
| 2016/0210195 A1 | 7/2016 | Sinha |
| 2017/0046349 A1 | 2/2017 | Shankar et al. |
| 2017/0277780 A1 | 9/2017 | Kesin et al. |

FOREIGN PATENT DOCUMENTS

| | | |
|---|---|---|
| CN | 102546446 A | 7/2012 |
| CN | 103167093 A | 6/2013 |

(56) References Cited

FOREIGN PATENT DOCUMENTS

| | | |
|---|---|---|
| CN | 102054015 B | 5/2014 |
| DE | 102014103482 A1 | 9/2014 |
| DE | 102014204827 A1 | 9/2014 |
| DE | 102014204830 A1 | 9/2014 |
| DE | 102014204834 A1 | 9/2014 |
| DE | 102014215621 A1 | 2/2015 |
| EP | 0652513 A1 | 5/1995 |
| EP | 1191463 A2 | 3/2002 |
| EP | 1672527 A2 | 6/2006 |
| EP | 2487610 A2 | 8/2012 |
| EP | 2551799 A2 | 1/2013 |
| EP | 2555126 A2 | 2/2013 |
| EP | 2555153 A1 | 2/2013 |
| EP | 2560134 A1 | 2/2013 |
| EP | 2778977 A1 | 9/2014 |
| EP | 2835745 A2 | 2/2015 |
| EP | 2835770 A2 | 2/2015 |
| EP | 2838039 A2 | 2/2015 |
| EP | 2846241 A1 | 3/2015 |
| EP | 2851852 A1 | 3/2015 |
| EP | 2858014 A2 | 4/2015 |
| EP | 2858018 A1 | 4/2015 |
| EP | 2863326 A1 | 4/2015 |
| EP | 2863346 A1 | 4/2015 |
| EP | 2869211 A2 | 5/2015 |
| EP | 2884439 A1 | 6/2015 |
| EP | 2884440 A1 | 6/2015 |
| EP | 2889814 A1 | 7/2015 |
| EP | 2891992 A1 | 7/2015 |
| EP | 2892197 A1 | 7/2015 |
| EP | 2911078 A2 | 8/2015 |
| EP | 2911100 A1 | 8/2015 |
| EP | 2940603 A1 | 11/2015 |
| EP | 2940609 A1 | 11/2015 |
| EP | 2963577 A1 | 1/2016 |
| EP | 2963595 A1 | 1/2016 |
| EP | 2985729 A1 | 2/2016 |
| EP | 3018879 A1 | 5/2016 |
| EP | 3037991 A1 | 6/2016 |
| EP | 3038046 | 6/2016 |
| GB | 2513247 A | 10/2014 |
| GB | 2516155 A | 1/2015 |
| GB | 2518745 A | 4/2015 |
| NL | 2012778 A | 11/2014 |
| NL | 2013306 A | 2/2015 |
| NZ | 624557 A | 8/2014 |
| WO | WO-2000009529 A2 | 2/2000 |
| WO | WO-2002065353 A1 | 8/2002 |
| WO | WO-2005104736 A2 | 11/2005 |
| WO | WO-2005116851 A2 | 12/2005 |
| WO | WO-2008011728 A1 | 1/2008 |
| WO | WO-2008064207 A2 | 5/2008 |
| WO | WO-2008113059 A1 | 9/2008 |
| WO | WO-2009061501 A1 | 5/2009 |
| WO | WO-2010000014 A1 | 1/2010 |
| WO | WO-2010030913 A2 | 3/2010 |
| WO | WO-2010098958 A1 | 9/2010 |
| WO | WO-2012025915 A1 | 3/2012 |
| WO | WO-2013010157 A1 | 1/2013 |
| WO | WO-2013102892 A1 | 7/2013 |
| WO | WO-2013126281 A1 | 8/2013 |

OTHER PUBLICATIONS

"5 Great Tools for Visualizing your Twitter Followers", Amnet Blog, http://www.amnetblog.com/component/content/article/115-5-great-tools-for-visualizing-your-twitter-followers.html, (Aug. 4, 2010), 1-5.
"A First Look: Predicting Market Demand for Food Retails using a Huff Analysis", TRF Policy Solutions, CDFI Fund, Capacity Building Initiative, (Jul. 2012), 1-30.
"A Quick Guide to UniProtKB Swiss-Prot & TrEMBL", UniProt Consortium, Ongoing and future developments at the Universal Protein Resource, (Sep. 2011), 1-2.
"About 80 Minutes: Palantir in a number of parts—Part 6—Graph", http://about80minutes.blogspot.com/2013/03/palantir-in-number-of-parts-part-6-graph.html, (Mar. 21, 2013), 1-7.
"About connecting shapes", Microsoft Office—Visio, [Online] retrieved from the internet: <http://office.microsoft.com/enus/visio-help/about-connecting-shapes-HP085050369.aspx>, (Aug. 4, 2011), 6 pgs.
"About OWA", Open Web Analytics, [Online]. Retrieved from the Internet: <URL: http://www.openwebanalytics.com/?page jd=2>, (Accessed: Jul. 19, 2013), 5 pgs.
"Add and glue connectors with the Connector tool", Microsoft Office—Visio,, [Online] retrieved from the internet: <http://office.microsoft.com/en-us/visio-help/add-and-glue-connectors-with-the-connector-tool-HA010048532.aspx?CTT =1 >, (Aug. 4, 2011), 1 pg.
"An Introduction to KeyLines and Network Visualization", Keylines.com, [Online]. Retrieved from the Internet: <URL: http://keylines.com/wp-content/uploads/2014/03/KeyLines-White-Paper.pdf>, (Mar. 2014), 8 pgs.
"Analytics for Data Driven Startups", Trak.io, [Online]. Retrieved from the Internet: <URL: http://trak.io/>, (Accessed: Jul. 18, 2013), 3 pgs.
"Apache HBase", Webpage; Apache HBase Overview page, (Sep. 9, 2011), 1.
"Beta Testing on the Fly", TestFlight, [Online]. Retrieved from the Internet: <URL: https://testflightapp. com/>, (Accessed: Jul. 18, 2013), 3 pgs.
"Bug 18726—[feature] Long-click means of invoking contextual menus not supported", Bugzilla@Mozilla, [Online] retrieved from the internet: <http://bugzilla.mozilla.org/show_bug.cgi?id=18726>, (Jun. 13, 2013), 11 pgs.
"Chapter 2: IBM InfoSphere DataStage stages", IBM Corp; Modification 0 of IBM Information Server, Version 8, Release 1, 1st Edition, (2008), 35-137.
"Countly", Countly Mobile Analytics, [Online]. Retrieved from the Internet: <URL: http://count.ly/products/screenshots, (accessed Jul. 18, 2013), 9 pgs.
"Data Powered Mobile Advertising", Free Mobile App Analytics and various analytics related screen shots, (Jul. 18, 2013), 8 pgs.
"DISTIMO—App Analytics", [Online]. Retrieved from the Internet: <URL: http://www.distimo.com/app-analytics, (accessed Jul. 18, 2013), 5 pgs.
"E-security begins with sound security policies", Symantec Corporation, Announcement Symantec, XP002265695, (Jun. 14, 2001), 1,9.
"Federated Database System", From Wikipedia, (Sep. 7, 2013), 1-6.
"Flurry Analytics", [Online]. Retrieved from the Internet: <URL: http://www.flurry.com/, (accessed Jul. 18, 2013), 14 pgs.
"Getting Started with VBA in Word 2010", Microsoft-Developer Network,, [Online] retrieved from the internet: <http://msdn.microsoft.com/en-us/library/ff604039%28v=office. 14%29.aspx>, (Apr. 4, 2014), 17 pgs.
"GIS-NET 3 Public-Department of Regional Planning", Planning & Zoning Information for Unincorporated LA County, [Online] retrieved from the internet: <http://qis.planning.lacounty.gov/GIS-NET3 Public/Viewer.html>, (Oct. 2, 2013).
"Google Analytics Official Website—Web Analytics & Reporting", [Online]. Retrieved from the Internet: <URL: http://www.google.com/ analytics/index.html, (accessed Jul. 18, 2013), 22 pgs.
"Hunchlab: Heat Map and Kernel Density Calculation for Crime Analysis", Azavea Journal, [Online]. Retrieved from the Internet: <www.azavea.com/blogs/newsletter/v4i4/kernel-density-capabilities-added-to-hunchlab>, (Sep. 9, 2014), 2 pgs.
"Identify—Defintion", Downloaded Jan. 22, 2015, (Jan. 22, 2015), 1 pg.
"KeyLines Datasheet", Keylines.com, [Online]. Retrieved from the Internet: <URL: http://keylines.com/wp-content/uploads/2014/03/KeyLines-datasheet.pdf>, (Mar. 2014), 2 pgs.
"Map Builder: Rapid Mashup Development Tool for Google and Yahoo Maps!", http://web.archive.org/web/20090626224734/http://www.mapbuilder.net/, (Jul. 20, 2012), 2 pgs.
"Map of San Jose, CA", Bing, [Online] retrieved from the internet: <http://maps.bing.com>, (Oct. 2, 2013), 1 pg.

(56) References Cited

OTHER PUBLICATIONS

"Map of San Jose, CA", Google, [Online] retrieved from the internet: <http://maps.google.com>, (Oct. 2, 2013), 1 pg.

"Map of San Jose, CA", Yahoo, [Online] retrieved from the internet: <http://maps.yahoo.com>, (Oct. 2, 2013), 1 pg.

"Mixpanel: Actions speak louder than page views", Mobile Analytics, [Online]. Retrieved from the Internet: <URL: https://mixpanel.com/>, (Accessed: Jul. 18, 2013), 13 pgs.

"Mobile App Marketing & Analytics", Localytics, [Online]. Retrieved from the Internet: <URL: http://www.localytics.com/>, (Accessed: Jul. 18, 2013), 12 pgs.

"Mobile Web", Wikipedia:, [Online] retrieved from the internet:https://en.wikipedia.org/w/index.php?title=Mobile Web&oldid=643800164, (Jan. 23, 2015), 6 pgs.

"More than android analytics", UserMetrix, [Online]. Retrieved from the Internet: <URL: http://usermetrix.com/android-analytics>, (Accessed: Jul. 18, 2013), 3 pgs.

"More Than Mobile Analytics", Kontagent, [Online]. Retrieved from the Internet: <URL: http://www. kontagent. com/>, (Accessed: Jul. 18, 2013), 9 pgs.

"Multimap", Wikipedia, [Online]. Retrieved from the Internet: <URL: https://en.wikipedia.org/w/index.php?title=Multimap&oldid=530800748>, (Jan. 1, 2013), 2 pgs.

"Overlay—Definition", Downloaded Jan. 22, 2015, (Jan. 22, 2015), 1.

"Palantir Labs—Timeline", https://www.youtube.com/watch?v=JCgDW5bru9M, (Oct. 2010), 1 pg.

"Piwik—Free Web Analytics Software", Piwik, [Online]. Retrieved from the Internet: <URL: http://piwik.org/>, (Accessed: Jul. 19, 2013), 18 pgs.

"Potential Money Laundering Warning Signs", [Online] Retrieved from the internet: <https://web.archive.org/web/20030816090055/http://finsolinc.com/ANTI-MONEY%2OLAUNDERING%20TRAINING%20GUIDES.pdf>, (Accessed 2003), 6 pgs.

"Realtime Constant Customer Touchpoint", Capptain—Pilot your apps, [Online] retrieved from the internet: <http://www.capptain.com>, (accessed Jul. 18, 2013), 6 pgs.

"Refresh CSS ellipsis when resizing container", Stack Overflow, [Online]. Retrieved from the Internet: <URL: http://stackoverflow.com/questions/17964681/refresh-css-ellipsis-when-resizing-container>, Accessed: May 18, 2015, (Jul. 31, 2013), 1 pg.

"Smart Thinking for Super Apps", [Online]. Retrieved from the Internet: <http://www.appacts.com>, (Jul. 18, 2013), 4 pgs.

"The Apache Cassandra Project" 3 pgs, 2015.

"The FASTA Program Package", fasta-36.3.4, (Mar. 25, 2011), 1-29.

"Toad for Oracle 11.6, Guide to Using Toad", Quest Software, (2012), 1-162.

"Visualizing Threats: Improved Cyber Security Through Network Visualization", Keylines.com, [Online] retrieved from the internet: <http://keylines.com/wp-content/uploads/2014/04/Visualizing-Threats1.pdf>, (May 12, 2014), 10 pgs.

"Welcome to StatCounter—Visitor Analysis for Your Website", StatCounter—Free Invisible Web Tracker, Hit Counter and Web Stats, [Online]. Retrieved from the Internet: <URL: http://statcounter.com/>, (Accessed: Jul. 19, 2013), 17 pgs.

"White Papers: Resources Center", Quartet FS, [Online]. [Archived Oct. 16, 2014]. Retrieved from the Internet: <URL: https://web.archive.org/web/20141016044306/http://quartetfs.com/resource-center/white-papers>, (Archived: Oct. 16, 2014), 7 pgs.

"White Papper: Managing Business Performance and Detecting Outliers in Financial Services", Quartet FS, [Online]. Retrieved from the Internet: <URL: https://quartetfs.com/images/pdf/white-papers/Quartet_FS_White_Paper_-_ActivePivot_Sentinel.pdf>, (Accessed: Oct. 10, 2016), 15 pgs.

Acklen, Laura, "Absolute Beginner's Guide to Microsoft Office Word 2003", (Dec. 24, 2003), 15-18, 34-41, 308-316.

Alfred, Rayner, "Summarizing Relational Data Using Semi-Supervised Genetic Algorithm-Based Clustering Techniques", Journal of Computer Science 6 (7), (2010), 775-784.

Ananiev, et al., "The New Modality API", Sun Developer Network (SDN), [Online] retrieved from the internet: <http://web.archive.org/web/20061211011958/http://java.sun.com/developer/technicaiArticles/J2SE/Desktop/javase6/modality/>, (Jan. 21, 2006), 12 pgs.

Anjewierden, et al., "Automatic Indexing of PDF Documents with Ontologies", Social Science Informatics, University of Amsterdam, The Netherlands, (Jun. 11, 2011), 8 pgs.

Antoshenkov, Gennady, "Dictionary-based order-preserving string compression", The VLDB Journal, #6, (1997), 1-14.

Baker, David W., et al., "The Development of a Common Enumeration of Vulnerabilities and Exposures", Presented at the Second International Workshop on Recent Advances in Intrusion Detection, (Sep. 1999), 1-35.

Baker, Jason, et al., "Megastore: Providing Scalable, Highly Available Storage for Interactive Services", 5th Biennial Conference on Innovative Data Systems Research (CIDR '11) Jan. 9-12, 2011, Asilomar, California, USA., (Jan. 2011), 223-234.

Bernstein, Philip, et al., "Hyder—A Transactional Record Manager for Shared Flash", 5th Biennial Conference on Innovative Data Systems Research (CIDR '11) Jan. 9-12, 2011, Asilomar, California, USA, (Jan. 2011), 9-20.

Bhosale, Safal V, "Holy Grail of Outlier Detection Technique: A Macro Level Take on the State of the Art", International Journal of Computer Science and Information Technologies, vol. 5(4), (2014), 5872-5874.

Bluttman, et al., "Excel Formulas and Functions for Dummies", Wiley Publishing, Inc.,, (2005), 280, 284-286.

Boyce, Jim, "Microsoft Outlook 2010 Inside Out", https://capdtron.files.wordpress.com/2013/01/outlook-2010-inside_out.pdf, (Aug. 1, 2010), 1-1111.

Canese, Kathi, et al., "Chapter 2: PubMed: The Bibliographic Database", The NCBI Handbook, (Oct. 2002), 1-10.

Celik, T, "CSS Basic User Interface Module Level 3 (CSS3 UI)", Section 8; Resizing and Overflow, [Online] retrieved from the Internet: <http://www.w3.org/TR/2012/WD-css3-ui-20120117/#resizing-amp-overflow>, (Jan. 17, 2012), 1-58.

Chang, et al., "A new multi-search engine for querying data through an Internet search service on CORBA", Computer Networks, vol. 34, Issue 3, (Sep. 2000), 467-480.

Chang, Fay, et al., "Bigtable: A Distributed Storage System for Structured Data", Google, Inc., (Jun. 2, 2008), 1-14.

Chaudhuri, Surajit, et al., "An Overview of Business Intelligence Technology", Communications of the ACM, vol. 54, No. 8., (Aug. 2011), 88-98.

Chen, et al., "Bringing Order to the Web: Automatically Categorizing Search Results", Proceedings of the SIGCHI conference on Human Factors in Computing Systems, The Haque, The Netherlands, (2000), 145-152.

Chung, Chin-Wan, "Dataplex: An Access to Heterogeneous Distributed Databases", Communications of the ACM, Association for Computing Machinery, Inc., vol. 33, No. 1, (Jan. 1, 1990), 70-80.

Cohn, David, et al., "Semi-supervised Clustering with User Feedback", Cornell University, (2003), 9 pgs.

Conner, Nancy, "Google Apps: The Missing Manual", (May 1, 2008), 15 pgs.

Delcher, Arthur, et al., "Identifying Bacterial Genes and Endosymbiont DNA with Glimmer", BioInformatics, vol. 23, No. 6, (2007), 673-679.

Dramowicz, Ela, "Retail Trade Area Analysis Using the Huff Model", Directions Magazine,, [Online] retrieved from the internet: <http://www.directionsmag.com/articles/retail-trade-area-analysis-usinq-the-huff-model/123411>, (Jul. 2, 2005), 10 pgs.

Dreyer, Werner, et al., "An Object-Oriented Data Model for a Time Series Management System", IEEE—Proceedings of the 7th International Working Conference on Scientific and Statistical Datablse Management; Charlottesvlle, Virginia USA,, (1994), 12 pgs.

Elmasri, Ramez, et al., "Fundamentals of Database Systems", Fourth Edition—Chapter 14—Indexing Structures for Files, (2004), 455-491.

Gesher, Ari, "Palantir screenshots in the wild: Swing Sightings", [Online] Retrieved from the internet: <https://www.palantir.com/2007/09/palantir-screenshots/>, (Sep. 11, 2007), 1-12.

(56) References Cited

OTHER PUBLICATIONS

Golmohammadi, et al., "Data Mining Applications for Fraud Detection in Securities Market", Intelligence and Security Informatics Conference (EISIC) 2012 European, IEEE,, (Aug. 22, 2012), 107-114.
Gorr, et al., "Crime Hot Spot Forecasting: Modeling and Comparative Evaluation", Grant 98-IJ-CX-K005, (May 6, 2002), 37 pgs.
Goswami, Gautam, "Quite Writely Said!", Blog: One Brick a Time, [Online]. Retrieved from the Internet: <URL: http://gautamg.wordpress.com/2006/08/21/quite-writely-said/>, (Aug. 2005), 7 pgs.
Griffith, Daniel A, et al., "A Generalized Huff Model", Geographical Analysis, vol. 14, No. 2, (Apr. 1982), 135-144.
Gu, et al., "BotMiner: Clustering Analysis of Network Traffice for Protocol-and-Structure-Independent Botnet Detection", USENIX Security Symposium, (2008), 17 pgs.
Gu, Lifang, et al., "Record Linkage: Current Practice and Future Directions", (Jan. 15, 2004), 32 pgs.
Hansen, D., et al., "Analyzing Social Media Networks with NodeXL: Insights from a Connected World", Chapter 4, pp. 53-67 and Chapter 10, pp. 143-164,, (Sep. 2010), 53-67; 143-164.
Hardesty, Larry, "Privacy Challenges: Analysis: It's Surprisingly Easy to Identify Individuals from Credit-Card Metadata", MIT News on Campus and Around the World, MIT News Office, (Jan. 29, 2015), 1-3.
Hibbert, et al., "Prediction of Shopping Behavior Using a Huff Model Within a GIS Framework", (Mar. 18, 2011), 16 pgs.
Hodge, et al., "A Survey of Outlier Detection Methodologies", Artificial Intelligence Review, vol. 22, No. 2, (Oct. 1, 2004).
Hogue, Andrew, et al., "Thresher: Automating the Unwrapping of Semantic Content from the World Wide Web", 14th International Conference on World Wide Web, WWW 2005, (May 2005), 42 pgs.
Hua, Yu, et al., "A Multi-attribute Data Structure with Parallel Bloom Filters for Network Services", HiPC 2006, LNCS 4297, (2006), 277-288.
Huang, Da Wei, et al., "Systematic and Integrative Analysis of Large Gene Lists Using DAVID Bioinformatics Resources", Nature Protocols, 4.1, (Dec. 2008), 44-57.
Huff, et al., "Calibrating the Huff Model Using ArcGIS Business Analyst", ESRI, (Sep. 2008), 33 pgs.
Huff, David L, "Parameter Estimation in the Huff Model", ESRI, ArcUser, (2003), 34-36.
Jelen, Bill, "Excel 2013 in Depth, Video Enhanced Edition", (Jan. 25, 2013), 20 pgs.
Kahan, J., et al., "Annotea: an open RDF Infrastructure for Shared Web Annotations", Computer Networks vol. 39, No. 5, (2002), 589-608.
Kitts, Paul, "Chapter 14: Genome Assembly and Annotation Process", The NCBI Handbook, (Oct. 2002), 1-21.
Klemmer, Scott R, et al., "Where Do Web Sites Come From? Capturing and Interacting with Design History", Association for Computing Machinery, CHI 2002, (Apr. 2002), 1-8.
Kokossis, A, et al., "D7-Dynamic Ontology Managment system (Design)", h-TechSight Consortium Oct. 2002, (Oct. 2002), 27 pgs.
Levi, Micheal, "Money Laundering Risks and E-Gaming: A European Overview and Assessment", [Online]. Retrieved from the Internet: <URL: http://www.egba.eu/pdf/Levi_Final_Money_Laundering_Risks_egaming%20280909.pdf>, (2009), 30 pgs.
Li, H., et al., "Interactive Multimodal Visual Search on Mobile Device", IEEE Transactions on Multimedia, vol. 15, No. 3, (Apr. 1, 2013), 594-607.
Li, Shing-Han, et al., "Identifying the signs of fraudulent accounts using data mining techniques", Computers in Human Behavior, vol. 28, (2012), 1002-1013.
Liu, T., "Combining GIS and the Huff Model to Analyze Suitable Locations for a New Asian Supermarket in the Minneapolis and St. Paul, Minnesota USA", Papers in Resource Analysis, 2012, vol. 14, (2012), 8 pgs.
Madden, "Chapter 16: BLAST Sequence Analysis Tool", The NCBI Handbook, (Oct. 2002), 1-15.
Manno, et al., "Introducing Collaboration in Single-user Applications through the Centralized Control Architecture", (2010), 10 pgs.
Manske, "File Saving Dialogs", [Online] retrieved from the internet: <http://www.mozilla.org/editor/ui specs/FileSaveDialogs.html>, (Jan. 20, 1999), 7 pgs.
Mentzas, G., et al., "An Architecture for Intelligent Assistance in the Forecasting Process", Proceedings of the 28th Annual Hawaii International Conference on System Sciences, (1995), 167-176.
Miklau, Gerome, et al., "Securing history: Privacy and accountability in database systems", 3rd Biennial Conference on Innovative Data Systems Research (CIDR), (2007), 387-396.
Mizrachi, Ilene, "Chapter 1: GenBank: The Nucleotide Sequence Database", The NCBI Handbook, (Oct. 2002), 1-14.
Ngai, E.W.T., et al., "The application of data mining techniques in financial fraud detection: A classification framework and an academic review of literature", Decision Support Systems 50 (2011), (2011), 559-569.
Niepert, M., et al., "A Dynamic Ontology for a Dynamic Reference Work", JCDL '07 Proceedings, ACM, (Jun. 2007), 10.
Nierman, Andrew, et al., "Evaluating Structural Similarity in XML Documents", U of Michigan, (2002), 1-6.
Nolan, Richard, et al., "MCARTA: A Malicious Code Automated Run-Time Analysis Framework", Homeland Security, 2012 IEEE Conference, (2012), 13-17.
Olanoff, Drew, "Deep Dive with the New Google Maps for Desktop with Google Earth Integration, It's More than Just a Utility", Retrieved from the internet: http://web.archive.org/web/20130515230641/http://techcrunch.com/2013/05/15/deep-dive-with-the-new-google-maps-for-desktop-with-google-earth-integration-its-more-than-just-a-utility/, (May 15, 2013), 1-6.
Palmas, et al., "An Edge-Bunding Layout for Interactive Parallel Coordinates", IEEE Pacific Visualization Symposium, (2014), 57-64.
Peng, Daniel, et al., "Large-scale Incremental Processing Using Distributied Transactions and Notifications", OSDI, (2010), 1-15.
Perdisci, Roberto, et al., "Behavioral Clustering of HTTP-Based Malware and Signature Generation Using Malicious Network Traces", USENIX, (Mar. 18, 2010), 1-14.
Rouse, Margaret, "OLAP Cube", [Online] retrieved from the internet: <http://searchdatamanagement.techtarget.com/definition/OLAP-cube>, (Apr. 28, 2012), 15 pgs.
Shah, Chintan, "Periodic Connections to Control Server Offer New Way to Detect Botnets", McAfee Labs, [Online]. Retrieved from the Internet: <URL: blogs.mcafee.com/mcafee-labs/periodic-links-to-control-server-offer-new-way-to-detect-botnets>, (Oct. 24, 2013), 6 pgs.
Shi, Liang, et al., "A Scalable Implementation of Malware Detection Based on Network Connection Behaviors", 2013 International Conference on Cyber-Enabled Distributed Computing and Knowledge Discovery, IEEE, (Oct. 10, 2013), 59-66.
Sigrist, Christian, et al., "PROSITE, a Protein Domain Database for Functional Characterization and Annotation", Nucleic Acids Research, vol. 38, (2010), D161-D166.
Sirotkin, Karl, et al., "Chapter 13: The Processing of Biological Sequence Data at NCBI", The NCBI Handbook, (Oct. 2002), 1-11.
Thompson, Mick, "Getting Started with GEO", (Jul. 26, 2011), 3 pgs.
Thomson, Alexander, et al., "The Case for Determinism in Database Systems", Proceedings of the VLDB Endowment, 3(1), (Sep. 2010), 70-80.
Umagandhi, R., et al., "Search Query Recommendations Using Hybrid User Profile with Query Logs", International Journal of Computer Applications, vol. 80, No. 10, (Oct. 1, 2013), 7-18.
Valentini, Giorgio, et al., "Ensembles of Learning Machines", Lecture Notes in Computer Science: Neural Nets, Springer Berlin Heidelberg, (Sep. 26, 2002), 3-20.
Wang, Guohua, et al., "Research on a Clustering Data De-Duplication Mechanism Based on Bloom Filter", IEEE, (2010), 5 pgs.
Wiggerts, T. A, et al., "Using Clustering Algorithms in Legacy Systems Remodularization", Proceedings of the Fourth Working Conference on Reverse Engineering, (1997), 33-43.

(56) References Cited

OTHER PUBLICATIONS

Wollrath, Ann, et al., "A Distributed Object Model for the Java System", Proceedings of the 2nd Conference on USENEX, Conference on Object-Orients Technologies and Systems, (Jun. 1996), 219-231.

Wright, Brandon, et al., "Palantir Technologies VAST 2010 Challenge Text Records—Investigations into Arms Dealing", (Oct. 29, 2010), 10 pgs.

Xiv, Golem, "A word about banks and the laundering of drug money", http://www.golemxiv.co.uk/2012/08/a-word-about-banks-and-the-laundering-of-drug-money/, (Aug. 18, 2012), 1-21.

Yang, et al., "Retroactive Answering of Search Queries", WWW 2006 Edinburgh, Scotland, (May 23-26, 2006), 457-466.

Yang, Yudong, "HTML Page Analysis Based on Visual Cues", 2001 IEEE, (2001), 859-864.

"BackTult—JD Edwards One World Version Control System", eKin Systems, Inc., (Accessed Jul. 23, 2007), 1 pg.

Butkovic, Asmir, et al., "Using Whois Based Geolocation and Google Maps API for support cybercrime investigations", Recent Advances in Telecommunications and Circuits:Proceedings of the 11th International Conference on Applied Electromagnetics, Wireless and Optical Communications (Electroscience '13),, Proceedings of the 2nd International Conference on Circuits, Systems, Communications, Computers and Applications (CSCCA '13), ) : Dubrovnik, Croatia, Jun. 25-27, 2013, pp. 194-200, 2013, (2013), 194-200.

Devanbu, Prem, et al., "Authentic Third-party Data Publication", [Online] Retrieved from the internet<http://www.cs.ucdavis.edu/~devanbu/authdbpub.pdf>, (Accessed Feb. 6, 2012), 19 pgs.

\* cited by examiner

| DOCUMENT SEARCH | SEARCH RESULTS | |
|---|---|---|
| MARINER AND EML_:D* | | SENT ON: 2012-12-22 |
| EML_JEFF.D*@COM... | MARINER | FROM: DAVID.D@COMCO.COM |
| NP_MARINER CONDUIT | MARINER | TO: JOHN.D@COMCO.COM |
| EML_DAVID.D*@COM... | MARINER | SUBJECT: RE: RUN DOWN TOWER |
| NP_MORE EXPOSURE | MARINER | BODY: |
| NP_RUN | MARINER | JOHN, WHERE ARE THE MATERIALS? ULTIMATELY WE WILL NEED MORE FOR THE MARINER PROJECT. IS THERE A RISK WITH THE SUPPLY OF 87K MARINER CONDUIT UNITS? DID WE COME UP SHORT OR ARE THERE ANY OTHER PLAYS WE CAN MAKE? |
| NP_DOWN | MARINER | |
| NP_TOWER | MARINER | |
| EML_WES.W*@COM... | MARINER | |
| UG_EXCESS | MARINER | |
| EML_KEN.K*@COM... | MARINER | |
| BG_SEWAGE | MARINER | |
| EML_JOHN.D*@COM... | MARINER | |
| EML_ANDY.R*@COM... | MARINER | |
| NP_DAVID | | |
| EML | RE: RUN DOWN TOWER | |
| UG_SEWAGE CON... | RE: EXCESS EXPOSURE | DAVID DELIOS/HOU/ECT ON 12/22/2012 01:19 PM ———— |
| NP_DELIOS | | -- FROM: JOHN DIFFEY/HOU/ |
| WML_WILL*.BIN@COM... | | |

ANALYSIS OF LARGE BODIES OF TEXTUAL DATA

PRIORITY APPLICATION

This application claims priority to U.S. Provisional Application Ser. No. 62/424,844, filed Nov. 21, 2016, the disclosure of which is incorporated herein in its entirety by reference.

TECHNICAL FIELD

The subject matter disclosed herein generally relates to machines configured to the technical field of special-purpose machines that facilitate analysis of large bodies of textual data including computerized variants of such special-purpose machines and improvements to such variants, and to the technologies by which such special-purpose machines become improved compared to other special-purpose machines that facilitate analysis of large bodies of textual data. Embodiments of the present disclosure relate generally to searching large sets of data and, more particularly, but not by way of limitation, to a system and method of identifying documents and additional elements of interest based on search terms.

BACKGROUND

Machine learning processes are often useful in making predictions based on data sets. Users may want to explore a large quantity of text or documents as part of a data set. Typically, an individual performs a series of searches, with the help of a search engine or search tool, to target individual specified aspects, things, entities, or people referenced in the documents. The series of searches may provide a separate lists of results from which the user manually identifies relevant documents. However, manual review of results within the list is often time consuming and prohibitive where the list of results is large.

BRIEF DESCRIPTION OF THE DRAWINGS

Various ones of the appended drawings merely illustrate example embodiments of the present disclosure and cannot be considered as limiting its scope.

FIG. 4 is a graphical user interface displaying textual identifications and elements of interest in differing portions based on received search terms, according to various example embodiments.

Figure 1:
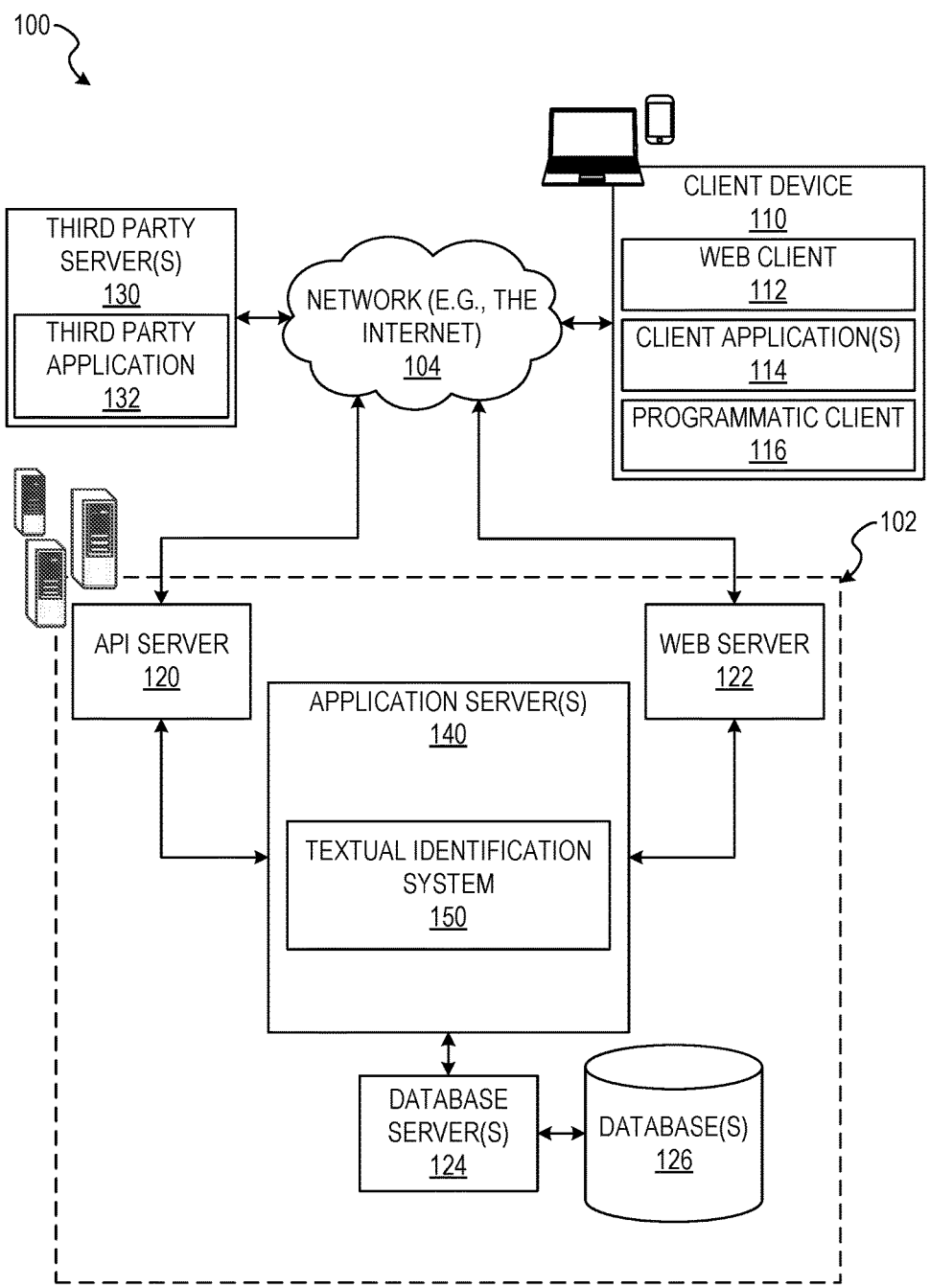
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Example embodiments described herein disclose a textual identification system configured to identify texts within a set of textual data and elements of interest from within the identified texts. In some instances, the textual identification system provides unique and semantically meaningful elements of interest from within the textual data to expand or focus searches performed on the set of textual data. The identification of elements of interest may eliminate or consolidate deviations within usage, context, and spelling of the elements of interest to improve types, accuracy, and semantically related content of the elements of interest with respect to an initial set of search terms.

For example, in some embodiments, the textual identification system may initially present a graphical user interface at a client device. Upon receiving search terms (e.g., selections from predetermined terms or freely entered term), the textual identification system identifies texts (e.g., text documents, video documents, audio documents, publications, or multimedia documents) from textual data accessible by the textual identification system. Based on the search terms and the identified texts, the textual identification system identifies and presents elements of interest (e.g., additional terms) associated with, or included in, the identified texts. The textual identification system parses the texts within the set of textual data to identify terms contained within the texts, the context in which the terms are used, deviations among usage and form of the terms, and meaningful semantic relationships among two or more terms within the texts. Based on the context, deviations, and meaningful semantic relationships of terms within the identified texts, the textual identification system generates a list of elements of interest and presents the elements of interest along with identifications of the identified texts.

The textual identification system provides technical improvements to previous search suggestion systems by identifying multiple disparate contextual uses and semantically meaningful combinations of terms within identified texts and with respect to the search terms used to identify the texts. Use of the indices, matrices, and data structures described herein may also increase the speed and precision with which additional terms are identified. Further, the textual identification system may better identify additional terms by merging or eliminating presentation of additional terms to remove extraneous terms, merge deviant uses of terms, and merging or separating terms based on contextual or semantically meaningful usage, thereby improving previous suggested search systems.

Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

With reference to FIG. 1, an example embodiment of a high-level client-server-based network architecture 100 is shown. A networked system 102, in the example forms of a network-based recommendation system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), a client application 114, and a programmatic client 116 executing on client device 110.

The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, and the like.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems comprising a textual identification system 150, which may comprise one or more modules or applications and which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the networked system 102. The databases 126 may also store digital item information in accordance with example embodiments.

Additionally, a third-party application 132, executing on third-party server(s) 130, is shown as having programmatic access to the networked system 102 via the programmatic interface provided by the API server 120. For example, the third-party application 132, utilizing information retrieved from the networked system 102, supports one or more features or functions on a website hosted by the third party. The third-party website, for example, provides one or more functions that are supported by the relevant systems or servers of the networked system 102.

The textual identification system 150 provides functionality operable to identify and retrieve documents or data and elements of interest in response to receiving search terms. For example, the textual identification system 150 may access sets of data (e.g., document corpora) stored in a structured format from the databases 126, the third-party servers 130, the client device 110, and other sources. In some example embodiments, the textual identification system 150 analyzes the set of data in order to determine portions of the data associated with the search terms and additional terms (e.g., elements of interest).

Further, while the network architecture 100 shown in FIG. 1 employs a client-server architecture, the present inventive subject matter is of course not limited to such an architecture, and could equally well find application in a distributed, or peer-to-peer, architecture system, for example. The textual identification system 150 could also be implemented as standalone software programs, which do not necessarily have networking capabilities.

Additionally, a third-party application 132, executing on a third-party server(s) 130, is shown as having programmatic access to the networked system 102 via the programmatic interface provided by the API server 120. For example, the third-party application 128, utilizing information retrieved from the networked system 102, may support one or more features or functions on a website hosted by the third party. The third-party website may, for example, provide one or more promotional, marketplace, or payment functions that are supported by the relevant applications of the networked system 102.

Figure 2:
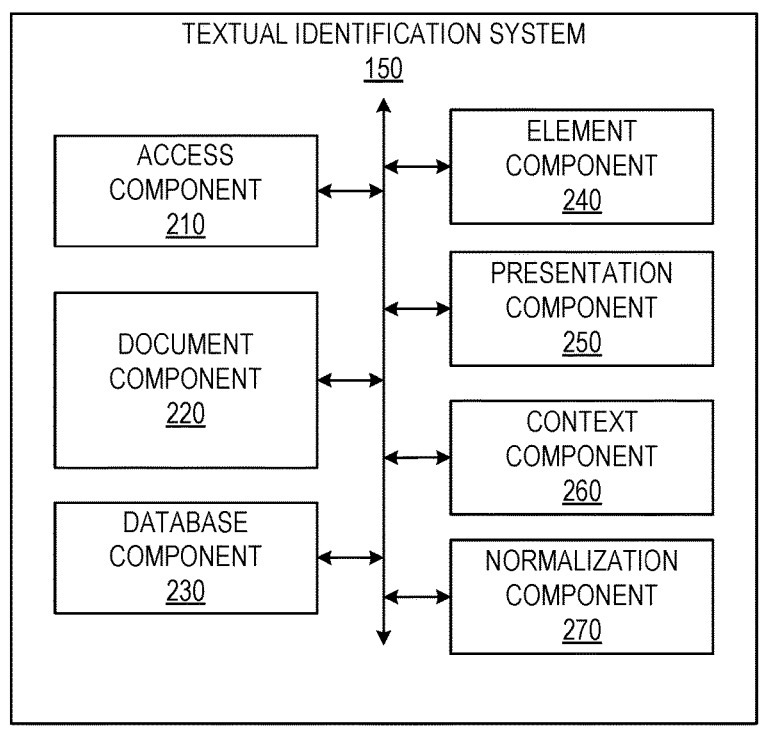
FIG. 2 is a block diagram illustrating various modules of a textual data identification system, according to various example embodiments.

FIG. 2 is a block diagram illustrating components of the textual identification system 150. Components of the textual identification system 150 configure the textual identification system 150 to access sets of textual data to identify texts or text sets within the textual data, identify data elements within the texts, and identify elements of interest based on data structures generated from the set of textual data. In some embodiments, the components configure the textual identification system 150 to generate initial data structures and modify the data structures to process the data within the data structure; increase accuracy and efficacy of elements of interest identified from the texts; and increase the speed with which a machine forming all or part of the textual identification system 150 identifies and presents the elements of interest at the machine. In order to perform these operations, the textual identification system 150 comprises an access component 210, a document component 220, a database component 230, an element component 240, a presentation component 250, a context component 260, and the normalization component 270. Any one or more of these components may be implemented using one or more processors and hence may include one or more processors (e.g., by configuring such one or more processors to perform functions described for that component).

The access component 210 accesses or otherwise receives selections of at least one document corpus from a set of document corpora. The access component 210 may access the set of textual corpora by accessing a set of metadata identifying the set of textual corpora. In some instances, the access component 210 accesses the set of textual corpora by accessing one or more database directly or via a network connection. The access component 210 may also access or otherwise receive one or more search terms within a graphical user interface. In some embodiments, the access component 210 retrieves a data structure including textual identifications for a set of textual data and an indication of one or more data elements within one or more texts included in the set of textual data.

The document component 220 identifies a set of textual data based on one or more search terms. The document component 220 may use search algorithms to identify the set of textual data based on an index of keywords associated with the content and metadata of the document. In some embodiments, the document component 220 dynamically partitions the set of textual data to identify a textual, textual component, a text or text set within a textual corpus, or a textual corpus containing the set of documents associated with the one or more search terms. In some instances, the document component 220 partitions a set of textual corpora or merges two or more textual corpora based on search terms received from the access component 210.

The database component 230 generates data structures and modified data structures. In some embodiments, the database component 230 generates data structures including textual identifications for texts within the set of textual data. The data structures may also include indications of one or more data elements within the texts. The data elements may be words, titles, names, addresses, numbers, or any other suitable information contained within a text. The database component 230 may generate modified data structures from the data structures generated to represent texts within the textual data. In some embodiments, the database component 230 generates modified data structures by assigning index numbers to each element, term, combinations of elements, or combination of terms within a data structure. A full index (e.g., the data structure) may be reduced to include texts within the set of textual data identified based on the search terms. The database component 230 may sum rows within the modified data structure. In some instances, the database component 230 also processes counts for the terms using one or more processes to transform the modified data structure and remove or discount popular or common entries adding little value to analysis based on high frequency of occurrence.

The element component 240 identifies elements of interest within modified data structures generated by the database component 230. In some embodiments, the elements of interest are identified, at least in part, based on the summed rows of the modified data structures. The element component 240 may map textual identifications of sets of textual data to rows in transformed or modified data structures generated by the database component 230. In some instances, the element component 240 selects elements of interest by summing values from transformed matrices based on comparison of values associated with the elements to an interest threshold. The element component 240 may also identify element types for each element of interest.

The presentation component 250 causes presentations of graphical user interfaces, visual indicators, portions of texts, and other elements described herein. In some embodiments, the presentation component 250 causes presentation of a graphical user interface including selectable interface elements configured to receive search terms or provide search terms for selection and subsequent query of the set of textual data. The presentation component 250 may cause presentation of elements of interest within the graphical user interface as well as portions of texts accessed or retrieved from the set of textual data based on the search terms provided to the access component 210. In some embodiments, the presentation component 250 causes presentation of unique and tailored graphical user interfaces based on a combination of the texts, the search terms, and the elements of interest. The tailored graphical user interfaces may be presented differently to different users based on the information retrieved by the textual identification system 150, the user performing the search, element relationships or collocations, combinations thereof, and other suitable information. In some instances, portions of the graphical user interface are dynamically generated, such that a portion of the graphical user interface may only appear when information relevant to the portion is retrieved, identified, or generated by the textual identification system 150. In these instances, the graphical user interface may automatically resize, reorient, repartition, or otherwise adjust one or more initially presented portions of the graphical user interface to accommodate addition of a new portion based on the inclusion of additional information from the textual identification system 150.

The context component 260 determines context occurrences for elements of interest within texts of the set of textual data. In some instances, the context component 260 tokenizes the context to provide an index number for terms included in a textual proximate to another term for which context is being determined. The context component 260 may associate index numbers for terms surrounding a specified term and may link instances of a term surrounding a specified term that have a lexical similarity.

The normalization component 270 normalizes elements of interest by removing redundant elements of interest based on the context occurrence of two or more elements of interest. The normalization component 270 may generate a normalized set of elements of interest by identifying deviations among the instances. In some embodiments, normalization of the elements of interest occurs without removing or merging instances of the terms within the data structures described herein. The normalization component 270 may pass the normalized set of elements of interest to the presentation component 250, such that the presentation component 250 presents the elements of interest without duplication of elements of interest having deviating instances.

Any one or more of the components described may be implemented using hardware alone (e.g., one or more of the processors of a machine) or a combination of hardware and software. For example, any component described in the textual identification system 150 may physically include an arrangement of one or more processors (e.g., a subset of or among the one or more processors of the machine) configured to perform the operations described herein for that component. As another example, any component of the textual identification system 150 may include software, hardware, or both, that configure an arrangement of one or more processors (e.g., among the one or more processors of the machine) to perform the operations described herein for that component. Accordingly, different components of the textual identification system 150 may include and configure different arrangements of such processors or a single arrangement of such processors as different points in time. Moreover, any two or more components of the textual identification system 150 may be logically or physically combined into a single component, and the functions described herein for a single component may be subdivided among multiple components. Furthermore, according to various example embodiments, components described herein as being implemented within a single machine, database, or device may be distributed across multiple machines, databases, or devices.

Figure 3:
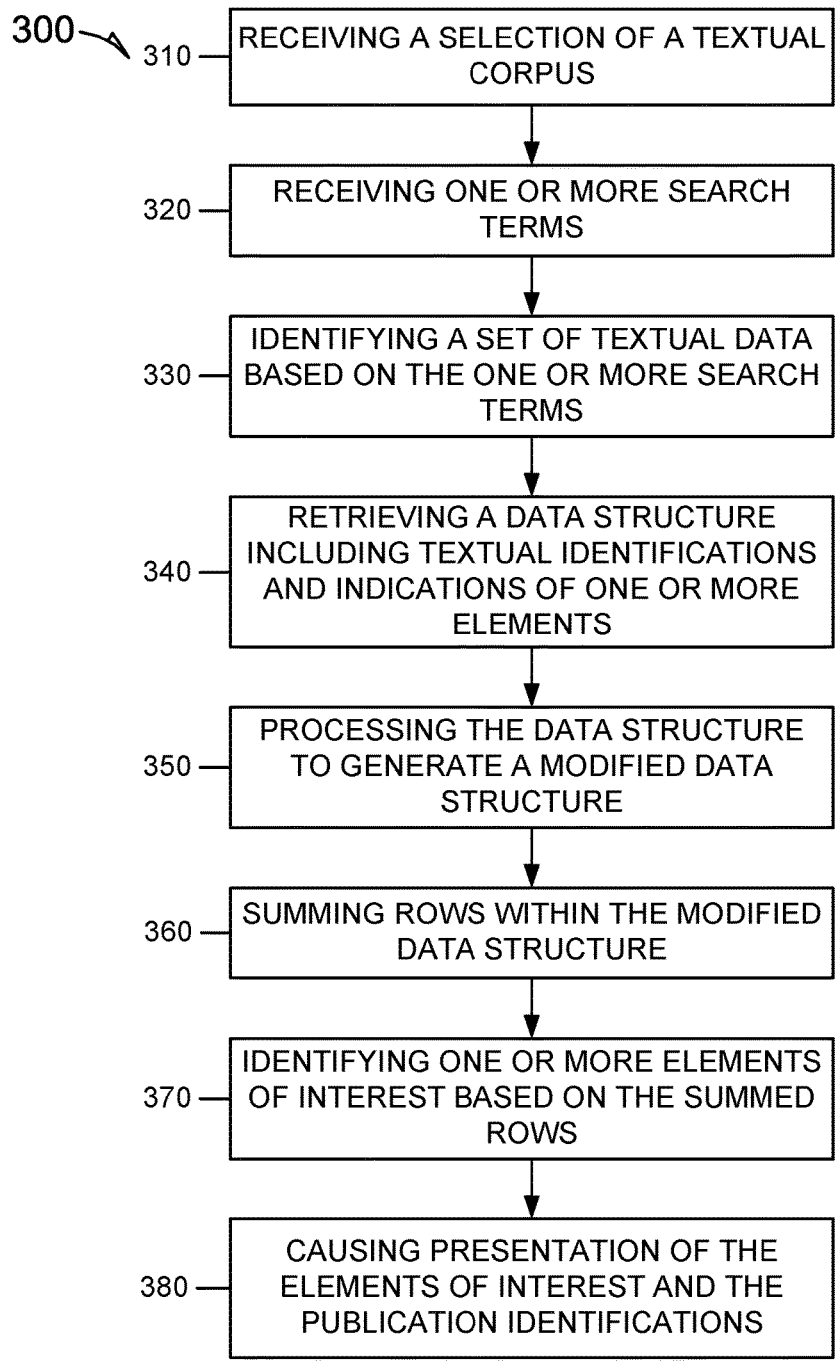
FIG. 3 is a flowchart illustrating individual operations of a method for processing and identifying elements of interest from content within a set of retrieved text sets, according to various example embodiments.

FIG. 3 is a flowchart illustrating operations of the textual identification system 150 in performing a method 300 of processing and identifying elements of interest from content within a set of retrieved documents, according to some example embodiments. Operations of the method 300 may be performed by the modules described above with respect to FIG. 2.

In operation 310, the access component 210 receives a selection of a textual corpus from a set of textual corpora. Each textual corpus of the set of textual corpora contains one or more texts. The texts or text sets may include documents of varying types. For example the document types may include text documents, video documents, audio documents, multimedia documents, and other suitable documents. In the present disclosure, "textual" is used interchangeably with a broad number of document types, publications (e.g., documents published or otherwise accessible directly or by a network connection). Further, although described as texts, text sets, sets of textual data, or textual corpora, it should be understood that one or more terms, such as publication, may be used interchangeably in the present disclosure or embodiments disclosed herein. The set of texts (e.g., set of documents) may be identified from the selected textual corpus (e.g., document corpus).

In some embodiments, the presentation component 250 is activated by a selection of a graphical interface element to initiate presentation of a graphical user interface, as shown in FIG. 4. The graphical user interface includes one or more graphical interface elements representing available selections within the graphical user interface. In some embodiments, the selections made available by the graphical interface elements include search term input, document corpus selection, search result selection, document selection, element of interest selection, and search type selection or entry. The access component 210 may receive the selection of the document corpus from an input device receiving a selection from a set of document corpora represented as discrete selectable graphical interface elements. The set of document corpora may be presented on a display device of a client device accessing one or more document servers.

In operation 320, the access component 210 receives or otherwise accesses one or more search terms displayed within the graphical user interface. In some embodiments, the access component 210 receives the search terms from an input device of a client device on which the graphical user interface is presented. The access component 210 receives the one or more search terms as one or more differing types of user input through the input device. For example, the one or more search terms may be received within a text input field (e.g., a text box presented in the graphical user interface), as a selection from a set of radio buttons, as a selection from a drop down menu, as a selection from a scroll menu, or any other suitable input type.

In operation 330, the document component 220 identifies a set of textual data (e.g., a set of documents or set of publication data) based on the one or more search terms. In some embodiments, the set of documents are identified based on a presence of the one or more search terms within the document or within metadata associated with the document. In some embodiments, once the documents are incorporated into a document corpus, a content of the document and metadata associated with the document may be parsed and indexed to identify keywords. Keywords may include words, named individuals, named entities (e.g., a city name, a project name, an organization name), titles, authors, fields (e.g., From, To, Carbon Copy, and Blind Carbon Copy fields), dates, and other suitable terms. The keywords and the metadata may be extracted from the documents and accompanying data using information extraction and machine learning algorithms. In some embodiments, the document component 220 uses one or more search engine algorithms to identify the set of documents based on the index of the keywords associated with the content and metadata of the document.

In operation 340, the access component 210 retrieves a data structure including textual identifications (e.g., document identifications) for the set of textual data and an indication of the one or more data elements within the documents (e.g., texts within the textual data). In some embodiments, the data structure may be the index of keywords in the content and metadata of the documents identified based on the search terms. The index may include semantically meaningful collocations as well as the keywords from the content and the metadata. In some instances, the index is generated as a table having counts of the terms and semantically meaningful collocations within the document content and metadata. In some embodiments, the counts are a number of instances that a given term or semantically meaningful collocation occurs within the document content or the metadata for the document.

The indexes for the documents within the document corpus include collocations of semantically meaningful n-grams. Semantically meaningful collocations may include frequently occurring compositions of words having semantic meaning. For example, "strong" and "coffee" may occur together more often than a predetermined instance threshold and, when occurring together within a predefined distance, contain a semantic meaning, "strong coffee," which may not occur in collocations of synonyms of the two terms. In some instances, the semantically meaningful n-grams or collocations may be determined heuristically. The semantically meaningful n-grams or collocations may also be identified using semantic analysis, stochastic semantic analysis, natural language processing, natural language understanding, or any other suitable algorithmic identification of the meaningful semantic relation between collocated terms.

In operation 350, the database component 230 processes the data structure to generate a modified data structure. In some embodiments, to generate the modified data structure, the database component 230 assigns an index number to each term or semantically meaningful n-gram. The index number may be obtained by sorting the textual representations of the terms and semantically meaningful n-grams and associating each with a position in a sort order. For example, "Aardvark" may receive an index number of zero and "Zena" may receive an index number of one thousand.

The modified data structure may be generated by reducing the full index to documents included in the set of documents identified based on the one or more search terms. In some embodiments, the terms, semantically meaningful n-grams, entity names, and the like are provided values within the modified data structure to construct a count matrix. The count matrix may include documents (e.g., documents identified within a specified document corpus or set of document corpora) as rows and elements of interest (e.g., terms and semantically meaningful n-grams) as columns. The documents in the rows may be represented by a document identification (e.g., a numerical value, an alphanumeric combination, or a set of characters). The terms and semantically meaningful collocations may be represented within a cell of the columns by the term or terms and an indication of a term type. The term type may indicate a category for the term. The intersections between the rows and columns may include a value for a number of occurrences of the specified element of interest within the specified document.

In operation 360, the database component 230 sums rows within the modified data structure. The rows include values for data elements included in each of the identified set of documents. In some embodiments, the counts (e.g., values at the intersections of specified rows and columns) are processed using a Term Frequency-Inverse Document Frequency (TF-IDF) transformation. The TF-IDF transformation may discount popular items as less interesting. In some instances, the TF-IDF transformation is a two-step process. First, the database component 230 sums the number of documents in which each item occurs. Second, the database component 230 divides the entries in each of the table rows of the modified data structure by the sum. The database component 230 thereby decreases weights of less informative but more popular or frequent terms. The TF-IDF transformation may generate a transformed data structure. In some embodiments, the transformed data structure is used as the basis for identifying potentially interesting elements or terms.

In operation 370, the element component 240 identifies one or more elements of interest based on the summed rows of the modified data structure. In some embodiments, to extract the one or more elements of interest, the element component 240 maps document identifications of the set of documents identified in operation 330 to rows of the transformed data structure. Using the mapping, the element component 240 creates a smaller matrix (e.g., an element matrix) composed of the document rows returned as query results. In the element matrix, the element component 240 selects terms of interest by summing the values from the transformed matrix and identifying the terms having a summed value above an interest threshold. In some embodiments, the interest threshold is predetermined. In some instances, the interest threshold is dynamic. In these embodiments, the dynamic interest threshold may be set as a function of the summed values for the terms. For example, the dynamic interest threshold may be set, at the time of summing the values for the terms, to select terms and to return a set number of terms (e.g., elements of interest) for each document of the set of documents identified in operation 330.

In operation 380, the presentation component 250 causes presentation of the elements of interest in a first portion of the graphical user interface and the textual identifications for the set of documents in a second portion of the graphical user interface. In some embodiments, the presentation component 250 causes presentation of the elements of interest and the document identifications in the graphical user interface depicted in FIG. 4. A first portion 410, depicted in FIG. 4, displays the elements of interest (e.g., the terms from the transformed matrix). A second portion 420 displays the textual identifications. In some instances, the document identifications include one or more of the values from the transformed matrix, a title of the document, an identifying subset of content of the document, a selectable representation (e.g., a graphical or textual representation) of the document, or any other suitable identifying information for the documents of the set of documents. In some instances, as shown in FIG. 4, the elements of interest in the first portion 410 and the document identifications in the second portion 420 are presented distinctly from one another and without an indication of a relationship between the items included in the first portion 410 and those included in the second portion 420. In some embodiments, the presentation component 250 generates and presents the elements of interest and the document identifications to indicate a relationship between specified elements of interest and specified document identifications. For example, the document identifications may be spaced a distance apart enabling the elements of interest found within each identified document to be presented adjacent to the document identification of the document in which the elements of interest are found.

Figure 5:
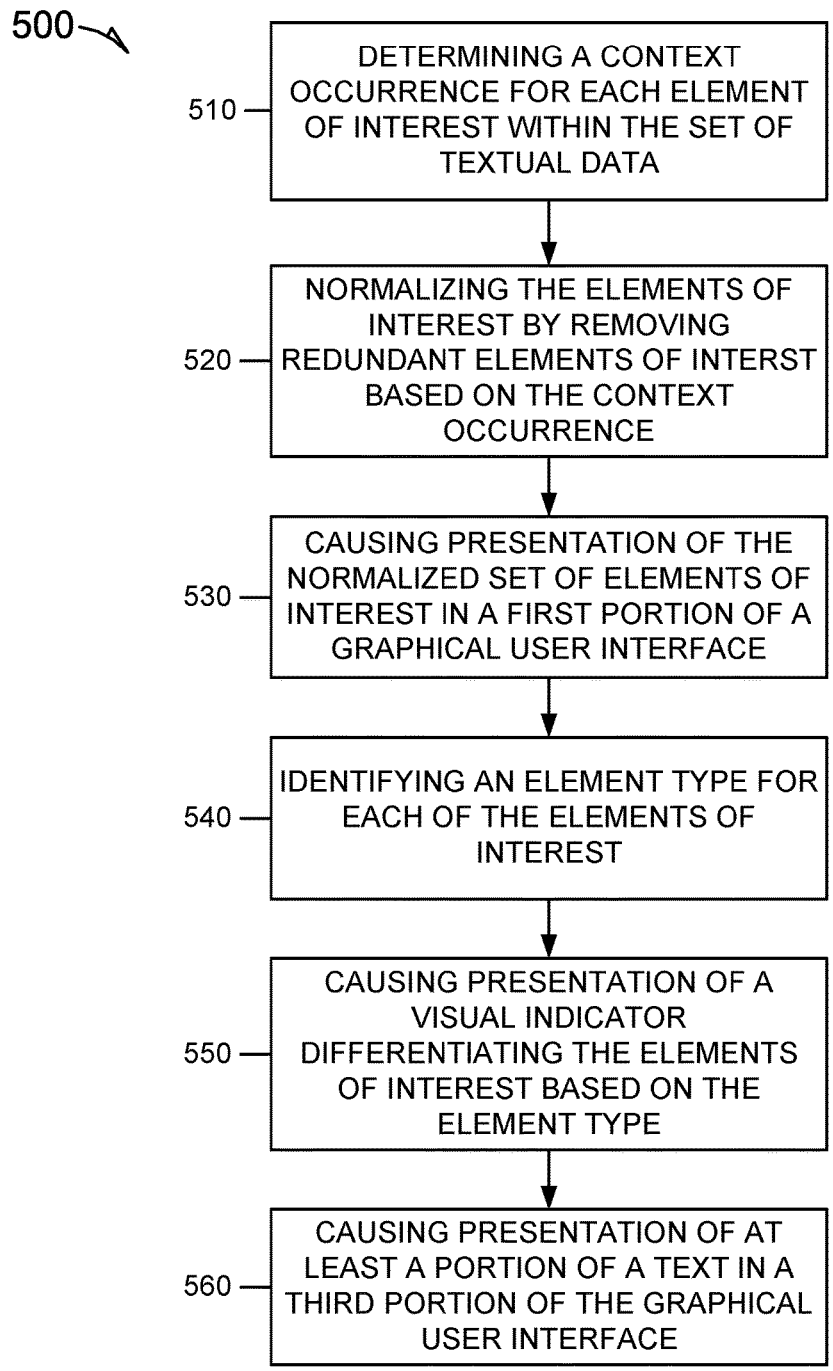
FIG. 5 is a flowchart illustrating operations of a method of processing and identifying elements of interest from content within a set of retrieved text sets, according to various example embodiments.

FIG. 5 is a flowchart illustrating operations of the textual identification system 150 in performing a method 500 of processing and identifying elements of interest from content within a set of retrieved documents, according to some example embodiments. Operations of the method 500 may be performed by the modules described above with respect to FIG. 2. In some example embodiments, one or more operations of the method 500 are performed as part or sub-operations of one or more operations of the method 300. In some instances, the method 500 may include one or more operations of the method 300.

In operation 510, the context component 260 determines a context occurrence for each element of interest within the set of documents. The context occurrence represents a number of related times a term occurs in a document. In some instances, a context around each term may be tokenized. The context component 260, in tokenizing the context, may identify an index number for terms included in the document proximate to the term for which context is being determined. The context component 260 may then associate, in a matrix, one or more index numbers for the terms surrounding the specified term for which the context is being identified. In some embodiments, the context component 260 associates the index numbers of surrounding terms for each instance of a term for which the context is being identified. For example, where the context component 260 is determining context for three instances of the term "cheese," the context component 260 may identify three sets of terms, with a set of terms surrounding each of the instances of the term "cheese." The context component 260 may identify the index number for each of the terms within the three sets of terms and associate the index numbers with the instance of the term that they surround.

After the context component 260 identifies and associates the index numbers with instances of the term, the context component 260 determines the context of an instance of the term by comparing the associated index numbers. The context component 260 may link two or more instances of the term for which the surrounding terms are determined to have a lexical similarity. The lexical similarity of surrounding terms may be identified based on an overlap of terms identified within the surrounding terms. Overlap of terms may be identified where the same term occurs in two or more of the surrounding terms. Lexical similarity may also be identified where terms in sets of surrounding terms are synonyms, have similar definitions, or are otherwise semantically related. In some instances, the lexical similarity may be determined based on Jaccard coefficients determined for the sets of surrounding terms defined by a size of set intersection divided by a size of a set union.

In operation 520, the normalization component 270 normalizes the elements of interest by removing redundant elements of interest based on the context occurrence of two or more elements of interest. The normalization component 270 generates a normalized set of elements of interest. The normalization component 270 may normalize instances of an element of interest within a document by identifying one or more deviations among the instances. Deviations may include misspellings, different case usage, partial omissions (e.g., omitting a term forming a linked set of terms such as a full name), or other suitable deviations. In some embodiments, normalizing the elements of interest removes redundant instances of the same element of interest within a list presented at a client device. Removal of the redundant instances may free attention space within the list and remove confusion between similar instances of a term that refer to the same entity. In some instances, the normalization component 270 normalizes the elements of interest for presentation without removing or merging instances of the terms within one or more of the matrices or indices described above. By maintaining separate instances of the element of interest, the normalization component 270 prevents the database component 230 from erroneously reducing a term's likelihood of being deemed important based on overrepresentation due to merged instances.

In operation 530, the presentation component 250 causes presentation of the normalized set of elements of interest in the first portion of the graphical user interface. In some embodiments, the presentation component 250 presents the normalized set of elements of interest similarly to or the same as described above with respect to operation 380. The normalized set of elements may be presented in the first portion of the graphical user interface. In some instances, the elements of the normalized set of elements are presented in an order according to their association with the documents identified based on the search terms. In some embodiments, the normalized set of elements may be presented as an ordered list independent of a relationship to the identified documents presented in the second portion 420.

In operation 540, the element component 240 identifies an element type for each of the elements of interest. In some embodiments, the element component 240 identifies the element type for the elements of interest by determining the elements of interest identified from the set of documents retrieved based on the search terms. The element component 240 may then parse one or more of the matrices or indices described above to identify the element type for each element of interest.

In operation 550, the presentation component 250 causes presentation of a visual indicator differentiating the elements of interest based on the element types. The visual indicator may be a graphical indicator or a textual indicator. In some instances, the visual indicator is coded to indicate the element type without including all of the characters or words for the element type. For example, the presentation component 250 may identify an element type as a city name and abbreviate or otherwise code the element type as "CN." Although the coding of the visual indicator has been described given a specific example of an abbreviation, it should be understood that the presentation component 250 may code the element type in any suitable manner. Further, in some embodiments, the presentation component may generate and cause presentation of key mapping codes and full names for element types.

In operation 560, the presentation component 250 causes presentation of at least a portion of a document of the set of documents in a third portion of the graphical user interface. In some embodiments, as shown in FIG. 4, the third portion 430 may be positioned proximate to the second portion 420. The portion of the document presented in the third portion 430 may include text from a text, text set, publication, or document selected or otherwise specified in the second portion. For example, where a user selects a graphical interface element representing a document identification in the second portion 420 of the graphical user interface, the presentation component 250 generates and causes presentation of the portion of the selected document in the third portion 430. In some embodiments, where the document or publication retrieved is a video document or an audio document, the third portion 430 of the graphical user interface may include selectable interface elements configured to display or play the video or audio document within the third portion 430 of the graphical user interface. In some instances, the third portion 430 of the graphical user interface includes an instance of an application configured to display or play the audio or video document. In addition to an interface element or an instance of an application, the third portion 430 may also include textual information representing, or included within, the video, audio, or multimedia document.

Figure 6:
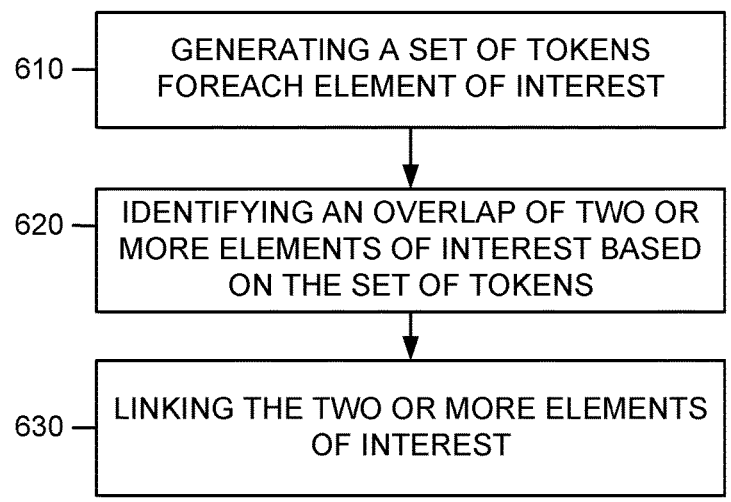
FIG. 6 is a flowchart illustrating operations of a method of processing and identifying elements of interest from content within a set of retrieved text sets, according to various example embodiments.

FIG. 6 is a flowchart illustrating operations of the textual identification system 150 in performing a method 600 of processing and identifying elements of interest from content within a set of retrieved documents, according to some example embodiments. Operations of the method 600 may be performed by the modules described above with respect to FIG. 2. The method 600 may include or be performed as part or sub-operations of one or more operations of the methods 300 or 500.

In operation 610, the context component 260 generates a set of tokens for each element of interest. The set of tokens may represent the context occurrence of a specified element. In some embodiments, operation 610 is performed in response to determining the context of occurrence for each element of interest, as described above with respect to operation 510 of the method 500. The context component 260 may tokenize each element of interest using the index numbers described above or may generate a separate set of context tokens. The tokens may be a numerical value or any other suitable value to identify the term and associate the term with the term for which the context is being identified.

In operation 620, the context component 260 identifies an overlap of two or more elements of interest based on the set of tokens for the two or more elements of interest. The overlap may be determined based on semantic relatedness. For example, the overlap may be determined based on occurrence of a term within two or more sets of tokens for the two or more elements. As described above, with respect to operation 510, the semantic relatedness or lexical similarity may be determined based on Jaccard coefficients determined for the set of tokens.

In operation 630, the context components 260 links the two or more elements of interest. The two or more elements of interest may be linked in one or more of the matrices or indices described above. In some instances, the two or more elements are linked by generating a context matrix for each document within the set of documents identified in relation to the one or more search terms described above with respect to the method 300. The context matrix may include the terms within a document in both rows and columns. A bit or value at an intersection of two terms may indicate a contextual link between the two terms. Although the linking of elements of interest has been described with respect to a matrix, it should be understood that the elements of interest may be linked using metadata, data tables, or any other suitable method.

Figure 7:
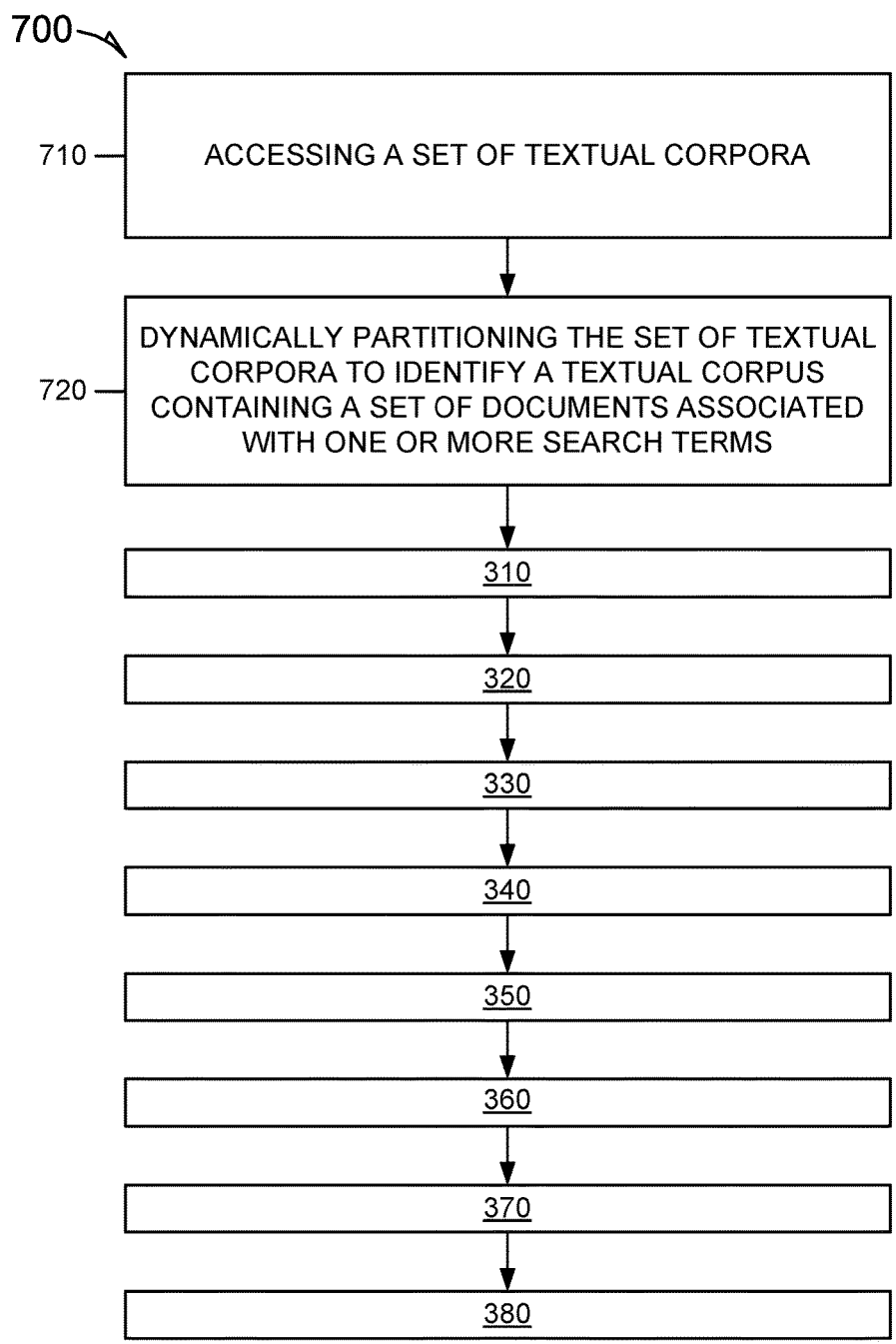
FIG. 7 is a flowchart illustrating operations of a method for processing and identifying elements of interest from content within a set of retrieved text sets, according to various example embodiments.

FIG. 7 is a flowchart illustrating operations of the textual identification system 150 in performing a method 700 of processing and identifying elements of interest from content within a set of retrieved documents, according to some example embodiments. Operations of the method 700 may be performed by the modules described above with respect to FIG. 2. The method 700 may include or be performed as part or sub-operations of one or more operations of the methods 300, 500, or 600.

In operation 710, the access component 210 accesses a set of document corpora. In some embodiments, the set of document corpora includes the selected document corpus of operation 310. In some instances, the set of document corpora is accessed in response to receiving the one or more search terms in operation 320. For example, as shown, operation 710 may occur after operations 310-380. As shown in FIG. 7, in these instances, the set of document corpora is accessed without prior selection of a specified document corpus. The access component 210 may access the set of document corpora by directly accessing one or more databases directly or via a network connection. In some embodiments, the access component 210 accesses the set of document corpora by accessing a set of metadata identifying the set of document corpora.

In operation 720, the document component 220 dynamically partitions the set of document corpora to identify a document corpus containing the set of documents associated with the one or more search terms. In some instances, the document component 220 identifies the document corpus by identifying the search terms among keywords associated with each document corpus of the set of document corpora. In some embodiments, each document corpus may be associated with a distinct database or data source. For example, each distinct database or data source may be associated with or part of a distinct client device. In identifying the document corpus, the document component 220 may select a client device from which the document component may select documents in response to receiving the one or more search terms.

In some embodiments, the document component 220 dynamically partitions the set of document corpora regardless of distribution of the document corpora among multiple client devices. In these instances, the document component 220 identifies the one or more search terms. The document component 220 may compare the one or more search terms with an index or matrix identifying terms associated with individual documents within each document corpus of the set of document corpora. The index or matrix may also identify the document corpus with which each of the documents are associated. The document component 220 may identify one or more document corpora from the index or matrix. The document component 220 may then perform a comparative analysis of the one or more document corpora to identify a single document corpus to search using the one or more search terms. In some instances, the comparative analysis identifies the document corpus having a highest number of occurrences of the search terms, and selects the specified document corpus.

In some instances, the document component 220 combines two or more document corpora to generate a dynamic document corpus. In these embodiments, where several document corpora include a suitable number of instances of occurrences of the search terms, the document component 220 selects the two or more document corpora and searches each of the document corpora for documents including the one or more search terms.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The components, methods, applications and so forth described in conjunction with FIGS. 1-7 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here as those of skill in the art can readily understand how to implement the subject matter in different contexts from the disclosure contained herein.

Software Architecture

Figure 8:
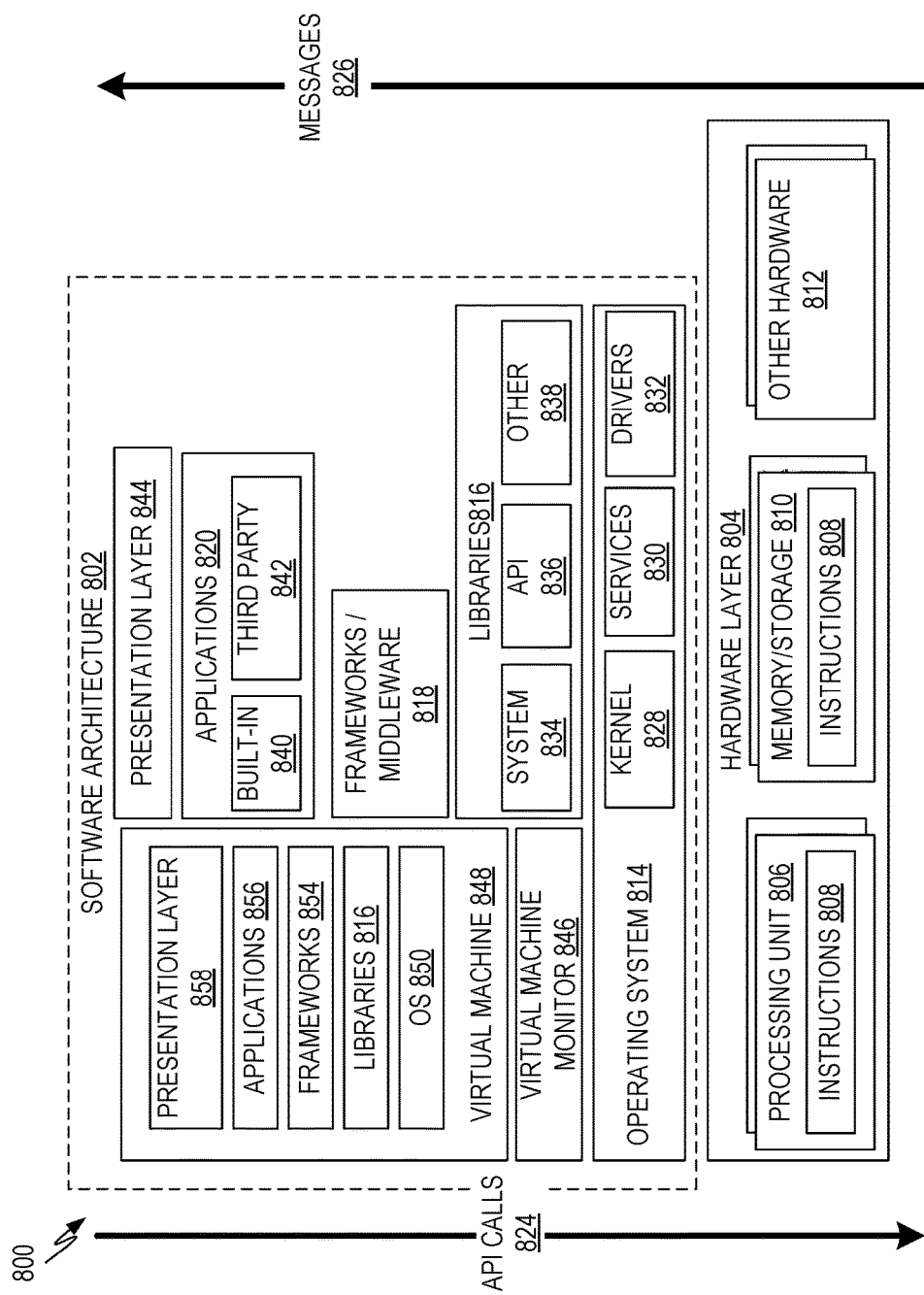
FIG. 8 is a block diagram illustrating an example of a software architecture that may be installed on a machine, according to some example embodiments.

FIG. 8 is a block diagram 800 illustrating a representative software architecture 802, which may be used in conjunction with various hardware architectures herein described. FIG. 8 is merely a non-limiting example of a software architecture and it will be appreciated that many other architectures may be implemented to facilitate the functionality described herein. The software architecture 802 may be executing on hardware such as a machine 900 of FIG. 9 that includes, among other things, processors 910, memory/storage 930, and I/O components 950. A representative hardware layer 804 is illustrated and can represent, for example, the machine 900 of FIG. 9. The representative hardware layer 804 comprises one or more processing units 806 having associated executable instructions 808. The executable instructions 808 represent the executable instructions of the software architecture 802, including implementation of the methods, components and so forth of FIG. 2. Hardware layer 804 also includes memory and/or storage modules 810, which also have executable instructions 808. Hardware layer 804 may also comprise other hardware as indicated by 812 which represents any other hardware of the hardware layer 804, such as the other hardware illustrated as part of machine 1000.

In the example architecture of FIG. 8, the software 802 may be conceptualized as a stack of layers where each layer provides particular functionality. For example, the software 802 may include layers such as an operating system 814, libraries 816, frameworks/middleware 818, applications 820 and presentation layer 844. Operationally, the applications 820 and/or other components within the layers may invoke application programming interface (API) calls 824 through the software stack and receive a response, returned values, and so forth illustrated as messages 826 in response to the API calls 824. The layers illustrated are representative in nature and not all software architectures have all layers. For example, some mobile or special purpose operating systems may not provide a frameworks/middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), WiFi® drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830, and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D information in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by the applications 820 and/or other software components/modules. For example, the frameworks 818 may provide various graphic user interface (GUI) functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 includes built-in applications 840 and/or third-party applications 842. Examples of representative built-in applications 840 may include, but are not limited to, a contacts application, a browser application, a book reader application, a location application, a media application, a messaging application, and/or a game application. The third-party applications 842 may include any of the built-in applications as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 842 may invoke the API calls 824 provided by the mobile operating system such as operating system 814 to facilitate functionality described herein.

The applications 820 may utilize built in operating system functions (e.g., kernel 828, services 830 and/or drivers 832), libraries (e.g., system libraries 834, API libraries 836, and other libraries 838), and frameworks/middleware 818 to create user interfaces to interact with users of the system. Alternatively, or additionally, in some systems interactions with a user may occur through a presentation layer, such as the presentation layer 844. In these systems, the application/module "logic" can be separated from the aspects of the application/module that interact with a user.

Some software architectures utilize virtual machines. In the example of FIG. 8, this is illustrated by a virtual machine 848. A virtual machine creates a software environment where applications/modules can execute as if they were executing on a hardware machine (such as the machine 900 of FIG. 9, for example). A virtual machine is hosted by a host operating system (e.g., operating system 814 in FIG. 9) and typically, although not always, has a virtual machine monitor 846, which manages the operation of the virtual machine as well as the interface with the host operating system (e.g., operating system 814). A software architecture executes within the virtual machine such as an operating system 850, libraries 816, frameworks/middleware 854, applications 856 and/or presentation layer 858. These layers of software architecture executing within the virtual machine 848 can be the same as corresponding layers previously described or may be different.

Example Machine Architecture and Machine-Readable Medium

Figure 9:
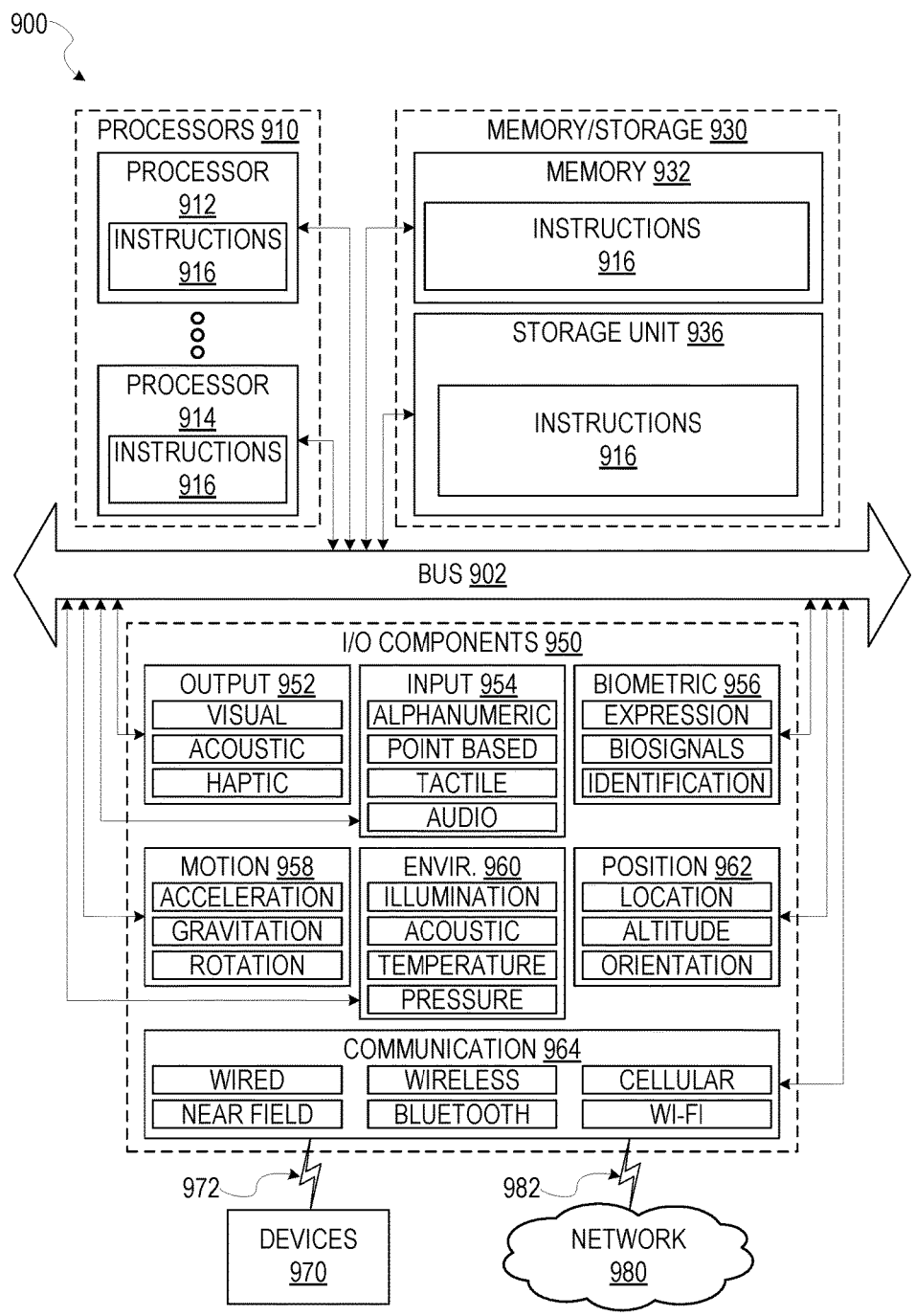
FIG. 9 illustrates a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions may cause the machine to execute the flow diagrams of FIGS. 3 and 5-7. Additionally, or alternatively, the instructions may implement in the components or modules of FIG. 2, and so forth. The instructions transform the general, non-programmed machine into a particular (e.g., special purpose) machine programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but is not limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 912 and processor 914 that may execute instructions 916. The term "processor" is intended to include multi-core processor that may comprise two or more independent processors (sometimes referred to as "cores") that may execute instructions contemporaneously. Although FIG. 9 shows multiple processors, the machine 900 may include a single processor with a single core, a single processor with multiple cores (e.g., a multi-core processor), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of the processors 910 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972 respectively. For example, the communication components 964 may include a network interface component or other suitable device to interface with the network 980. In further examples, communication components 964 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
   receiving one or more search terms within a graphical user interface;
   identifying, by one or more processors of a machine, a set of textual data based on the one or more search terms;
   retrieving a data structure including textual identifications for the set of textual data and an indication of one or more data elements within one or more text sets of the set of textual data;

processing, by the one or more processors, the data structure to generate a modified data structure, the modified data structure generated by reducing to text sets included in the set of textual data identified based on the one or more search terms;

summing rows, by the one or more processors, within the modified data structure, the rows including values for data elements included in each of the identified set of textual data;

identifying, by the one or more processors, one or more elements of interest within the set of textual data based on the summed rows of the modified data structure;

determining, by the one or more processors, a context of occurrence for each element of interest;

normalizing, by the one or more processors, the elements of interest by removing redundant elements of interest based on the context of occurrence of two or more elements of interest and generating a normalized set of elements of interest; and causing presentation of the normalized set of elements of interest in a first portion of the graphical user interface and the textual identifications for the set of textual data in a second portion of the graphical user interface.

2. The method of claim 1, wherein causing presentation of the elements of interest and the textual identifications further comprises:
causing presentation of at least a portion of a text set of the set of textual data in a third portion of the graphical user interface.

3. The method of claim 1, wherein causing presentation of the elements of interest further comprises:
identifying an element type for each of the elements of interest; and
causing presentation of a visual indicator differentiating the elements of interest based on an element type.

4. The method of claim 1, further comprising:
in response to determining the context of occurrence for each element of interest, generating a set of tokens for each element of interest, the set of tokens representing the context of occurrence;
identifying an overlap of two or more elements of interest based on the set of tokens for the two or more elements of interest; and
linking two or more elements of interest.

5. The method of claim 1 further comprising:
receiving a selection of a textual corpus from a set of textual corpora, each textual corpus of the set of textual corpora containing one or more text sets, the set of textual corpora identified from the selected textual corpus.

6. The method of claim 1, wherein identifying the set of textual data further comprises:
accessing a set of textual corpora, each textual corpus of the set of textual corpora containing one or more text sets; and
dynamically partitioning the set of textual corpora to identify a textual corpus from the set of textual corpora containing the set of text sets associated with the one or more search terms.

7. A computer implemented system, comprising:
one or more processors; and
a processor-readable storage device comprising processor-executable instructions that, when executed by the one or more processors, cause the one or more processors to perform operations comprising:
receiving one or more search terms within a graphical user interface;
identifying a set of textual data based on the one or more search terms;
retrieving a data structure including textual identifications for the set of textual data and an indication of one or more data elements within one or more text sets of the set of textual data;
processing the data structure to generate a modified data structure, the modified data structure generated by reducing to text sets included in the set of textual data identified based on the one or more search terms;
summing rows within the modified data structure, the rows including values for data elements included in each of the identified set of textual data;
identifying one or more elements of interest within the set of textual data based on the summed rows of the modified data structure;
determining a context of occurrence for each element of interest;
normalizing the elements of interest by removing redundant elements of interest based on the context of occurrence of two or more elements of interest and generating a normalized set of elements of interest; and
causing presentation of the normalized set of elements of interest in a first portion of the graphical user interface and the textual identifications for the set of textual data in a second portion of the graphical user interface.

8. The system of claim 7, wherein causing presentation of the elements of interest and the textual identifications further comprises:
causing presentation of at least a portion of a text set of the set of textual data in a third portion of the graphical user interface.

9. The system of claim 7, wherein causing presentation of the elements of interest further comprises:
identifying an element type for each of the elements of interest; and
causing presentation of a visual indicator differentiating the elements of interest based on an element type.

10. The system of claim 7, wherein the operations further comprise:
in response to determining the context of occurrence for each element of interest, generating a set of tokens for each element of interest, the set of tokens representing the context of occurrence;
identifying an overlap of two or more elements of interest based on the set of tokens for the two or more elements of interest; and
linking two or more elements of interest.

11. The system of claim 7, wherein the operations further comprise:
receiving a selection of a textual corpus from a set of textual corpora, each textual corpus of the set of textual corpora containing one or more text sets, the set of textual corpora identified from the selected textual corpus.

12. The system of claim 7, wherein identifying the set of textual data further comprises:
accessing a set of textual corpora, each textual corpus of the set of textual corpora containing one or more text sets; and
dynamically partitioning the set of textual corpora to identify a textual corpus from the set of textual corpora containing the set of text sets associated with the one or more search terms.

13. A processor-readable storage device comprising instructions that, when executed by one or more processors of a machine, cause the machine to perform operations comprising:
- receiving one or more search terms within a graphical user interface;
- identifying a set of textual data based on the one or more search terms;
- retrieving a data structure including textual identifications for the set of textual data and an indication of one or more data elements within one or more text sets of the set of textual data;
- processing the data structure to generate a modified data structure, the modified data structure generated by reducing to text sets included in the set of textual data identified based on the one or more search terms;
- summing rows within the modified data structure, the rows including values for data elements included in each of the identified set of textual data;
- identifying one or more elements of interest within the set of textual data based on the summed rows of the modified data structure;
- determining a context of occurrence for each element of interest normalizing the elements of interest by removing redundant elements of interest based on the context of occurrence of two or more elements of interest and generating a normalized set of elements of interest; and
- causing presentation of the normalized set of elements of interest in a first portion of the graphical user interface and the textual identifications for the set of textual data in a second portion of the graphical user interface.

14. The processor-readable storage device of claim 13, wherein causing presentation of the elements of interest and the textual identifications further comprises:
- causing presentation of at least a portion of a text set of the set of textual data in a third portion of the graphical user interface.

15. The processor-readable storage device of claim 13, wherein causing presentation of the elements of interest further comprises:
- identifying an element type for each of the elements of interest; and
- causing presentation of a visual indicator differentiating the elements of interest based on an element type.

16. The processor-readable storage device of claim 13, wherein the operations further comprise:
- in response to determining the context of occurrence for each element of interest, generating a set of tokens for each element of interest, the set of tokens representing the context of occurrence;
- identifying an overlap of two or more elements of interest based on the set of tokens for the two or more elements of interest; and
- linking two or more elements of interest.

17. The processor-readable storage device of claim 13, wherein identifying the set of textual data further comprises:
- accessing a set of textual corpora, each textual corpus of the set of textual corpora containing one or more text sets; and
- dynamically partitioning the set of textual corpora to identify a textual corpus from the set of textual corpora containing the set of text sets associated with the one or more search terms.

\* \* \* \* \*